(12) United States Patent
Towner et al.

(10) Patent No.: US 7,751,124 B2
(45) Date of Patent: Jul. 6, 2010

(54) ANAMORPHIC PRISMS

(75) Inventors: David Kenney Towner, Boise, ID (US); Michael Plotkin, Rehovot (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 54 days.

(21) Appl. No.: 12/258,739

(22) Filed: Oct. 27, 2008

(65) Prior Publication Data

US 2009/0296229 A1     Dec. 3, 2009

Related U.S. Application Data

(60) Provisional application No. 61/056,828, filed on May 29, 2008.

(51) Int. Cl.
*G02B 13/10* (2006.01)
*G02B 5/04* (2006.01)

(52) U.S. Cl. .................................. 359/669; 359/831
(58) Field of Classification Search ................. 359/668, 359/669, 831
See application file for complete search history.

(56) References Cited

U.S. PATENT DOCUMENTS 7,080,912 B2 * 7/2006 Cook .......................... 359/859

OTHER PUBLICATIONS

Variabel Amamorphic Lens for a 35-mm SLR, Applied Optics, vol. 22, No. 20, Oct. 1983, pp. 3249-3257.

* cited by examiner

*Primary Examiner*—William C Choi

(57) ABSTRACT

Various embodiments and methods relating to groups of anamorphic prisms that are configured to reduce smile in a multi-beam optical system are disclosed.

17 Claims, 24 Drawing Sheets

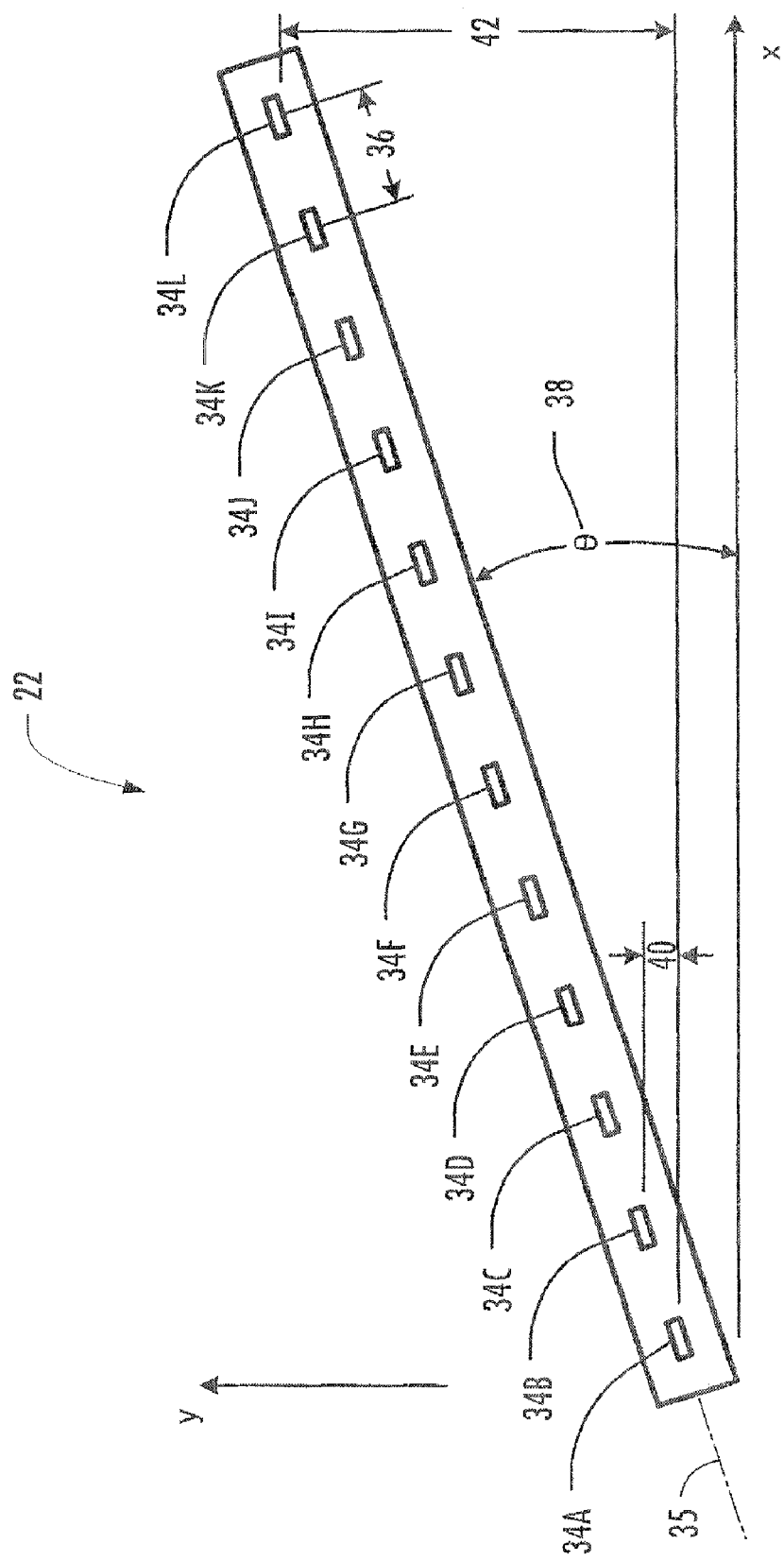

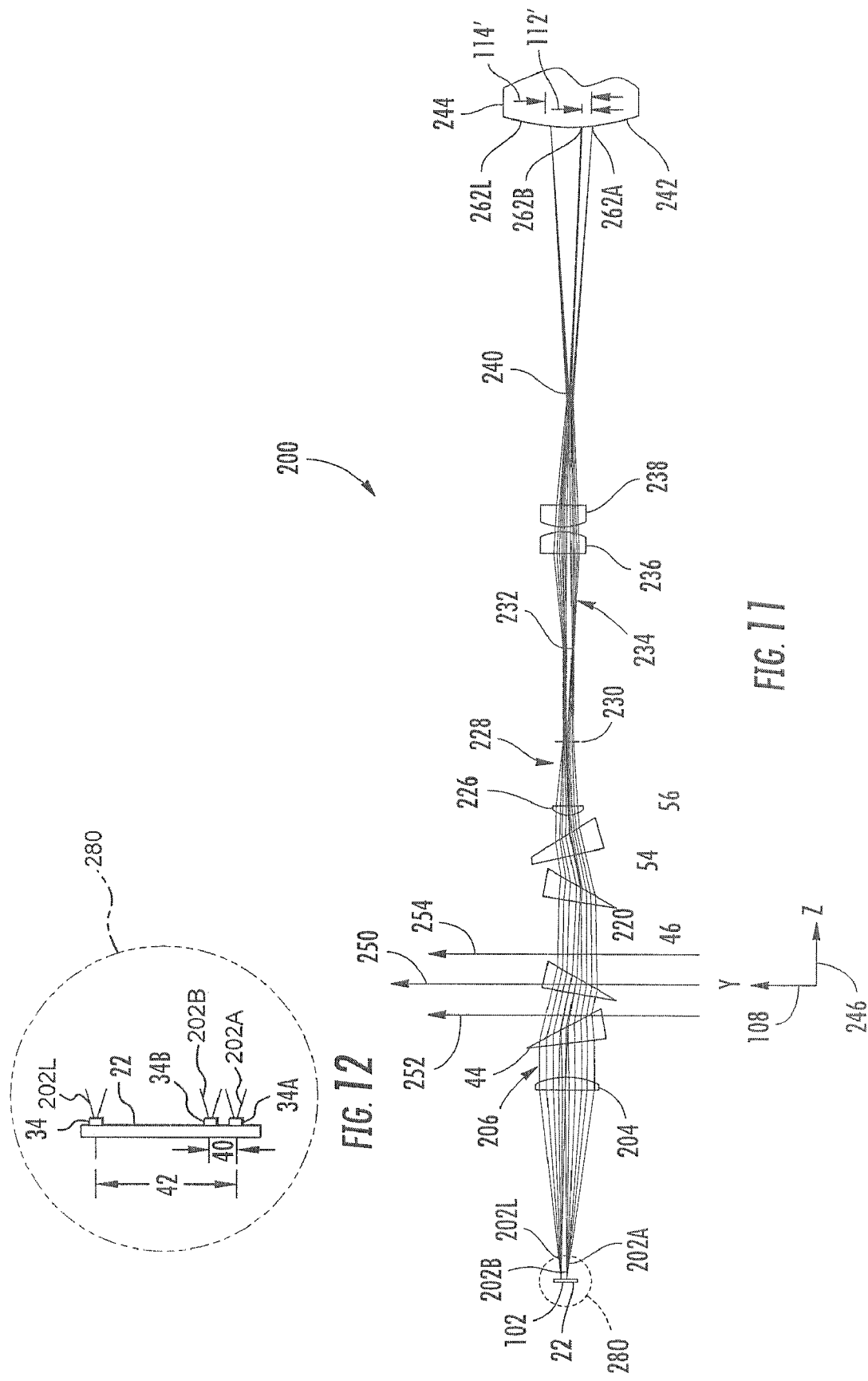

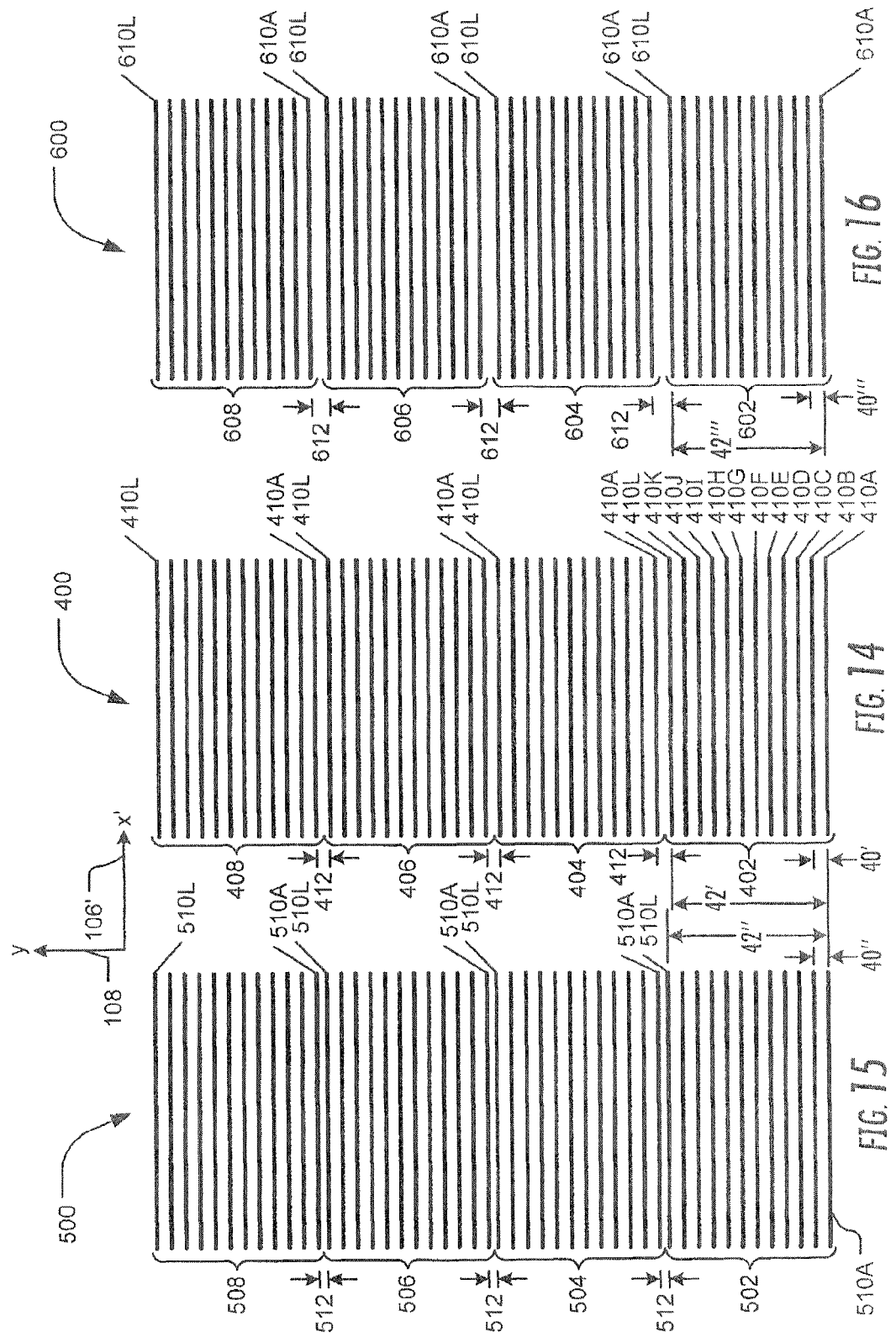

ANAMORPHIC PRISMS

CROSS-REFERENCE TO RELATED PATENT APPLICATIONS

This Application claims the benefit of provisional patent application Ser. No. 61/056,828, filed May 29, 2008, titled "ANAMORPHIC PRISMS", which application is incorporated by reference herein as if reproduced in full below.

The present application is related to co-pending U.S. patent application Ser. No. 11/709,394 Filed on Feb. 21, 2007 by Michael Plotkin, David Kenney Towner, Haim Livne and Peter Gysling and entitled METHOD AND APPARATUS FOR CONTROLLING MULTIPLE BEAM SPACING, the full disclosure of which is hereby incorporated by reference.

BACKGROUND

Optical systems sometimes include anamorphic prisms. The use of anamorphic prisms may introduce distortions or errors.

BRIEF DESCRIPTION OF THE DRAWINGS

FIG. 2 is a front elevation view of an emitter array of the system of FIG. 1 according to an example embodiment.

FIG. 11 is another schematic diagram of the multi-beam exposure system of FIG. 1 according to an example embodiment.

FIG. 12 is an enlarged side elevational view of an emitter array of the multi-beam exposure system of FIG. 11.

FIG. 14 is a diagram illustrating swaths of scan lines which are correctly aligned according to an example embodiment.

FIG. 15 is a diagram illustrating swaths of scan lines which are too widely spaced apart according to an example embodiment.

FIG. 16 is a diagram illustrating swaths of scan lines which are too narrowly spaced according to an example embodiment.

DETAILED DESCRIPTION OF THE EXAMPLE EMBODIMENTS

Figure 1A:
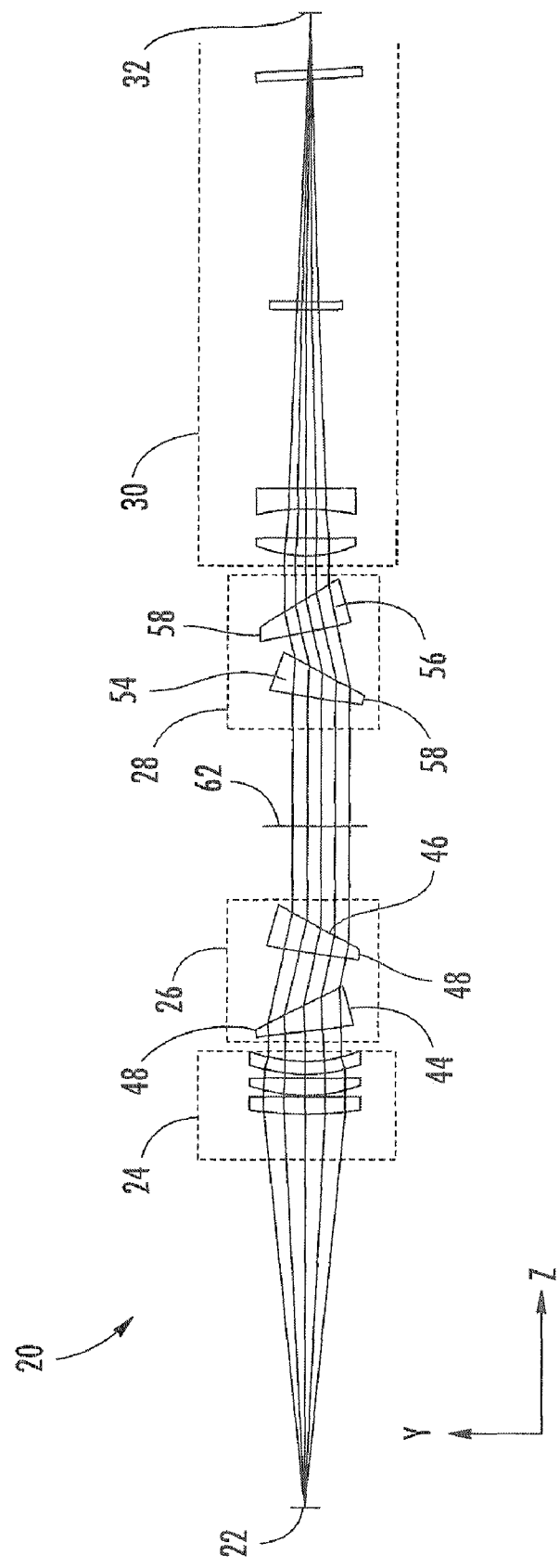
FIG. 1A is a schematic illustration of a first portion of a multi-beam exposure system according to an example embodiment.
Figure 1B:
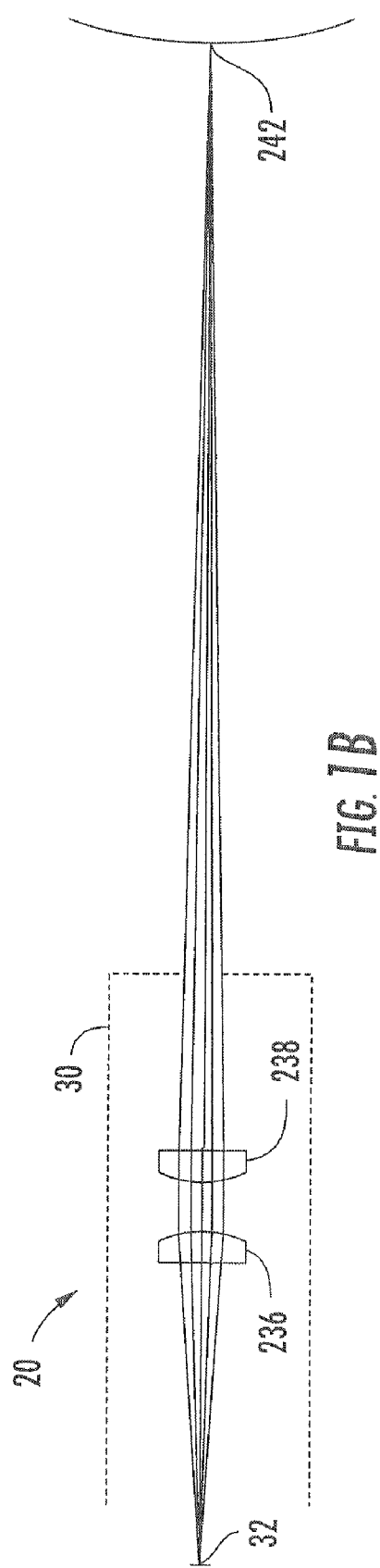
FIG. 1B is a schematic illustration of a second portion of a multi-beam exposure system according to an example embodiment.

FIGS. 1A and 1B schematically illustrate one example of a portion of a multi-beam exposure system 20 according to an example embodiment. Multi-beam exposure system 20 is configured to direct a plurality of beams of light or other electromagnetic radiation onto a surface to selectively expose portions of the surface. In one embodiment, multi-beam exposure system 20 is employed as part of an electrophotographic printing system. As will be described hereafter, multi-beam exposure system 20 compensates for or least partially corrects image spot position errors for enhanced exposure accuracy.

Exposure system 20 includes emitter array 22, optics 24, anamorphic prism group 26, anamorphic prism group 28, optics 30 and illuminated or exposed surface 242 (shown in FIG. 1B). Emitter array 22 comprises an arrangement of one or more emitters configured to provide multiple beams of light or other electromagnetic radiation. Such beams are directed towards optics 24.

FIG. 2 illustrates emitter array 22 in more detail. As shown by FIG. 2, emitter array 22 includes a plurality of individual light sources or emitters 34A-34L (collectively referred to as emitters 34) supported in proximity to one another along an axis 35. In the example illustrated, emitters 34 are fabricated or stacked with respect to one another in a fixed relation on a circuit board or other support structure. In other embodiments, emitters 34 may be individually mounted proximate to one another.

In the example illustrated, emitters 34 comprise laser diodes. In one embodiment, the laser diodes comprise elements of an edge-emitting laser array formed from a single epitaxial structure. In other embodiments, emitters 34 may comprise other elements configured to emit light or other electromagnetic radiation. For example, in other embodiments, array 34 may alternatively comprise elements of a one or two-dimensional vertical cavity surface emitting laser array (VCSEL), a vertical external-cavity surface-emitting laser array (VECSEL) and the like.

As shown by FIG. 2, emitters 34 are separated from one another by a spacing 36. However, to provide a vertical spacing between such emitters 34 in a y-axis direction, which is the cross-scan direction, that is less than spacing 36, emitter array 22 is supported at an angle 38 relative to the x-axis, which is the scan-direction axis. As a result, each emitter 34 is vertically spaced from one another by a spacing 40 less than spacing 36. The most distant emitters 34A and 34L are separated by a vertical spacing 42.

According to one example embodiment, spacing 36 is approximately 100 μm while spacing 40 is approximately 5 μm. In other embodiments, spacing 36 and spacing 40 may have other dimensions. In other embodiments, angle 38 may have different values. Adjustment of angle 38 enables different vertical spacings 40 between emitters 34 which are smaller than the spacings 36 between emitters 34 along axis 35.

Optics 24 comprises an arrangement of one or more lens elements configured to capture light beams produced by an emitter array 22 and to direct such light beams to anamorphic prism group 26. In the example illustrated, optics 24 collimates the divergent light beam from emitter array 22. Although optics 24 is illustrated as including three lenses, in other embodiments, optics 24 may comprise a smaller or larger number of such lenses or other optical elements for collimating the beams. In other embodiments, optics 24 may perform additional modifications of a light beam as well.

Anamorphic prism group 26 comprises one or more prism elements configured to receive multiple light beams from optics 24 and to compress such light beams. In the example illustrated, anamorphic prism group 26 compresses such light beams so as to reduce or least partially correct ellipticity in the beam cross-section caused by the elliptical beam divergence that may be produced by emitters 34, especially in the case of laser diode emitters 34.

In the example illustrated, anamorphic prism group 26 includes prism elements 44 and 46. Prism elements 44 and 46 are oriented with their optical vertices 48 (the intersection of input and output faces) on opposite sides of the optical axis. As a result, prism elements 44 and 46 are able to both compress the collimated beams of light from optics 24 without altering the beams' dimensions in the orthogonal direction (into the page as seen in FIG. 1) and, in this example, while also maintaining parallelism between the input and output optical axes on either side of the prism group. Each prism element 44 and 46 has an associated beam compression factor and contributes to the overall beam compression applied to the beams to reduce or correct beam ellipticity.

Figure 3:
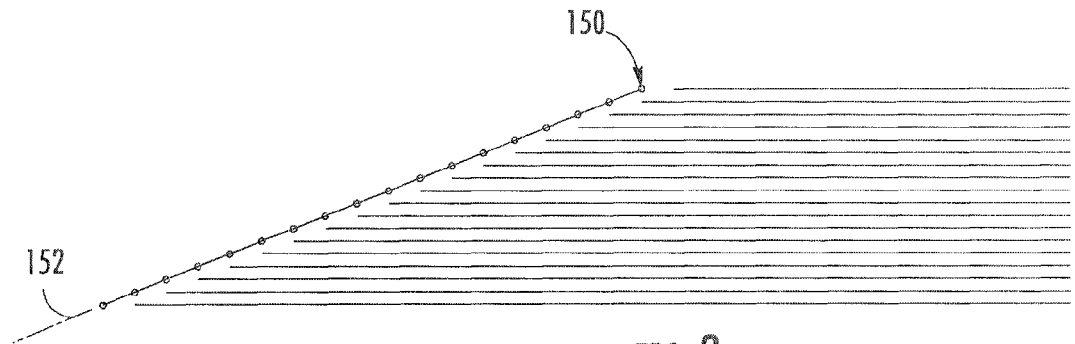
FIG. 3 is a diagram of image spots and scan lines at a photosensitive surface in the absence of errors according to an example embodiment.
Figure 4A:
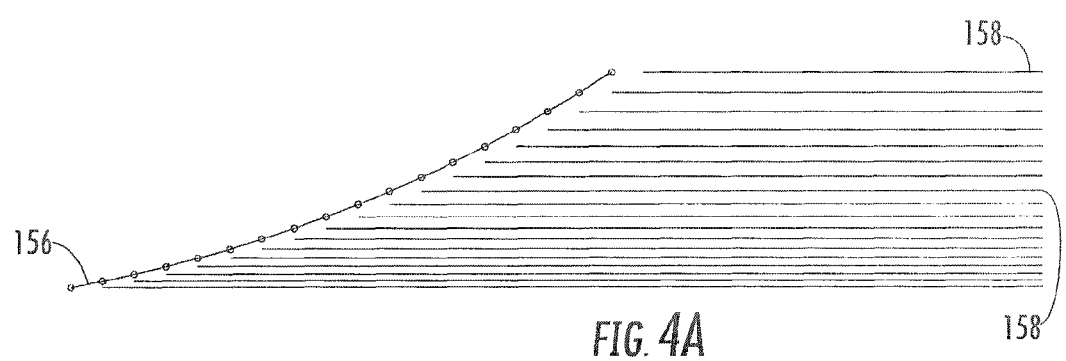
FIG. 4A is a diagram of image spots and scan lines at a photosensitive surface in the presence of smile according to an example embodiment.
Figure 4D:
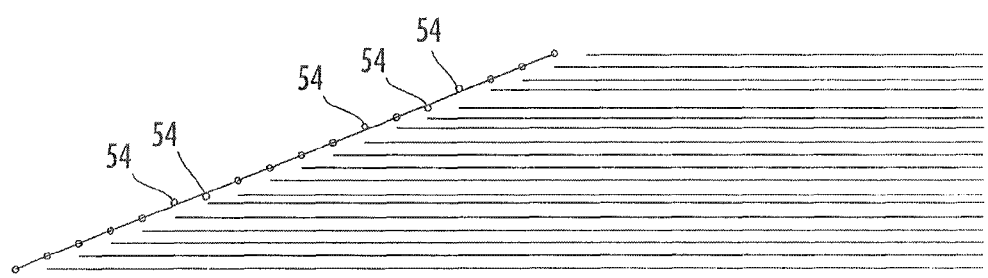
FIG. 4D is a diagram of image spots and scan lines at a photosensitive surface in the presence of transverse chromatic aberration (TCA) errors according to an example embodiment.

FIG. 3 illustrates the desired geometry of image spots 150 produced by the beams at a photosensitive surface 242 of a photosensitive medium 244 in FIG. 11 after passing through the entire optical system. As shown by FIG. 3, the desired vertical spacing 151 between adjacent spots 150 and the spacing 153 between adjacent spots 150 along axis 152 are uniform and proportional to the vertical spacing 40 between adjacent emitters and the spacing 36 between adjacent emitters along axis 35, respectively (shown in FIG. 2). FIGS. 4A and 4D illustrate the actual geometry of the image spots 154 formed by the beams on photosensitive surface 242 after the beams have passed through a single anamorphic prism group such as prism group 26. As shown by FIGS. 4A and 4D, anamorphic prism group 26, when used without anamorphic prism group 28, introduces two kinds of errors in the positions of image spots 154 and in the spacing of resulting scan lines 158 at photosensitive surface 242: (1) errors due to smile and (2) errors due to transverse chromatic aberration.

As shown by FIG. 4A, smile errors are systematic angular beam direction errors introduced by an anamorphic prism that cause corresponding errors in the Y-height of image spots 154 for object points (e.g., emitter locations) that are displaced from the optical axis at an X-angle or in an X-direction. Smile can thus be regarded as the coupling of an X-direction field angle into a Y-direction beam pointing error that causes image spots in an image plane to be in the form an upward or downward curvature of the array of image spots 154, when the corresponding object points lie along a straight line have a component of separation in the X-direction. In the example illustrated, image spots 154 are generally located along the arcuate or curved line 156. The curvature of line 156 and, more generally, the curvature of an image of a linear object (e.g., a linear emitter array) results from an optical distortion inherent in the imaging characteristics of a single anamorphic prism group, such as prism group 26 when used without prism group 28. Such smile errors cause a corresponding systematic variation in scan-line spacing within a swath of scan lines as shown by the nonuniform spacing between the scan lines 158. This variation in scan line spacing may result in banding in printed output. As a result, such variation in scan line spacing may potentially limit achievable print quality, especially as the number of beams per scan swath increases.

Figure 4B:
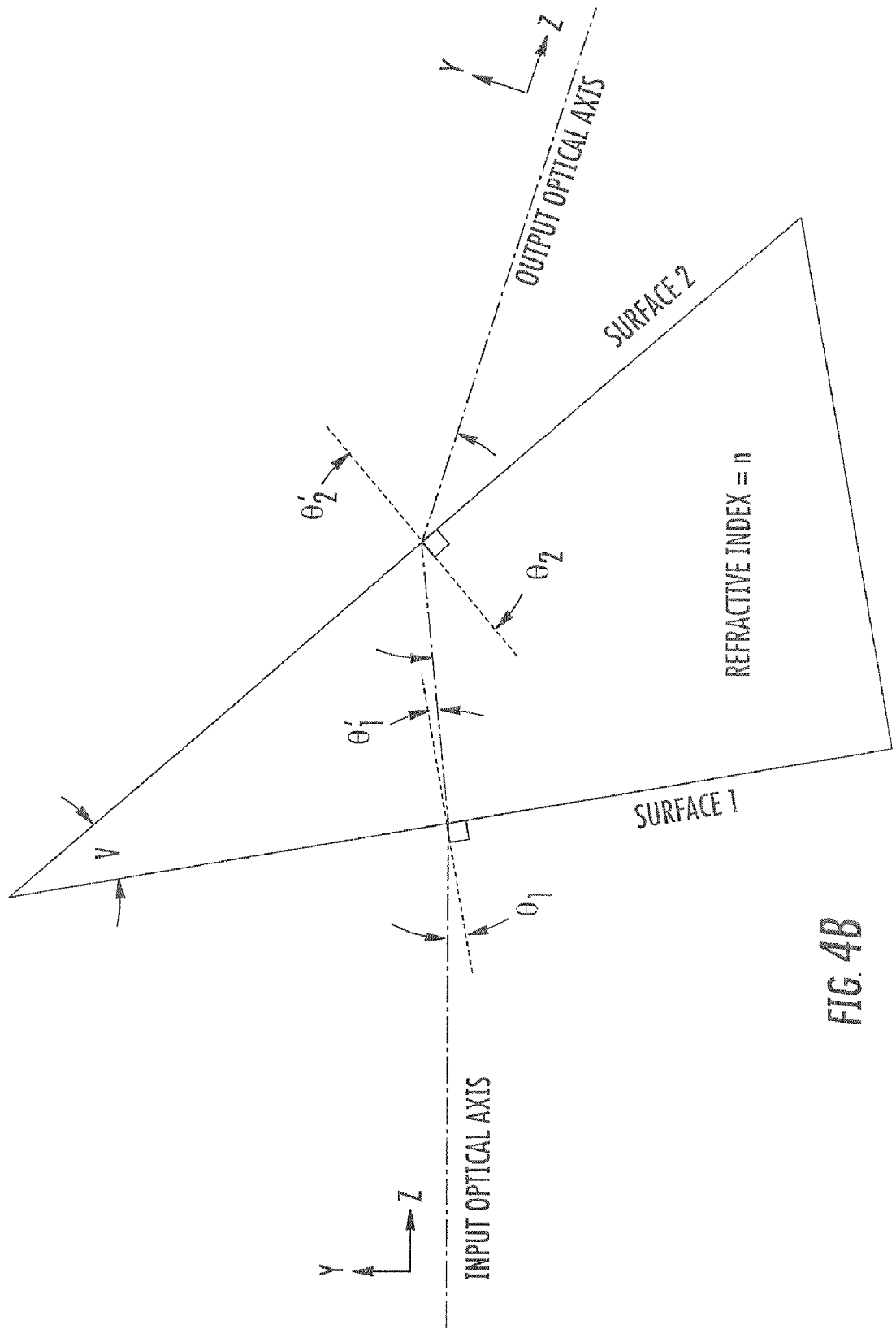
FIG. 4B is a side elevational view of a prism element according to an example embodiment.

It has been discovered that smile errors or contributions introduced by each prism element in each of anamorphic prism groups 26 and 28 may be quantified using the following identified relationships. Using such identified relationships, the characteristics of the prism elements that form groups 24 and 26 may be constructed, chosen or provided so as to cooperate with one another to eliminate such smile errors or to reduce their overall resulting smile errors. In one embodiment, the two or more prism elements of anamorphic prism groups 24 and 26 cooperate with one another to achieve a collective smile error of less than or equal to about 0.000004. As discussed in more detail below, this value is the tangent of an angular error and is therefore unitless FIG. 4B illustrates an example prism element for purposes of describing the features or characteristics of the prism element and their interrelationships which cause a smile error contribution by the prism element. For purposes of this discussion, the following definitions apply.

"Optical Axis" Defined

An axial ray is a light ray having a wavelength equal to the nominal wavelength of the light emitter, originating at the center of the light emitter or array of light emitters, and passing through the center of the aperture stop of the optical system. The optical axis is the path along which an axial ray propagates or would propagate in passing through the optical system. Because the optical axis is a possible path for a physically realizable ray it is redirected as if it were a real ray according to the laws of refraction and reflection. Where the center of the emitter or the center of the aperture stop are undefined, the optical axis is a real ray path that coincides with the axis of symmetry of a lens or other optical element, such as optics 24 in FIG. 1, in the optical path between a light emitter location and the first element of the first prism group.

"Prism Element", "Surface Normal Vector", and "Plane of Incidence" Defined

A prism element is an optical element comprising a transmissive material, typically an optical glass, having a first optical surface and a second optical surface each configured to receive and transmit a beam of light or other electromagnetic radiation. The first optical surface has a first surface normal vector which originates at the optical axis location on the first optical surface, is perpendicular to the first optical surface, and points away from the transmissive material forming the prism. Similarly, the second optical surface has a second surface normal vector which originates at the optical axis location on the second optical surface, is perpendicular to the second optical surface, and also points away from the transmissive material forming the prism. A "plane of incidence" at an optical surface is the plane containing the corresponding surface normal vector and the optical axis along which an input ray is incident. Although the optical axis generally changes direction in passing through such an optical surface, it lies in the plane of incidence both before and after such refraction as described by Snell's Law.

Coordinate Directions Defined

As illustrated by the coordinate directions shown in FIG. 4B, a local coordinate system is defined for each segment of the optical axis. For each straight-line portion of the optical axis, the Z-direction is parallel to the optical axis and the positive Z-direction is the direction of beam propagation. The Y-direction at any surface is perpendicular to the Z-direction and parallel to the plane of incidence. By convention, the positive Y-direction is "upward" in optical system illustrations, the positive Z-direction is to the right and the positive X-direction, which is mutually perpendicular to the Y and Z directions, is directed into the plane of the drawing to form a right-handed Cartesian coordinate system.

Where changes in optical axis direction are caused by intervening mirrors or other optical components between such prism groups, the local coordinate system for each section of the optical axis can be determined according to the conventions used to propagate a "local optical axis" representing a real ray path by Zemax, CodeV, OSLO and other optical design software commonly used by those skilled in the art.

"Vertex Line" and "Vertex Angle" Defined

The plane of the first optical surface is orthogonal to the first surface normal vector and contains the point of intersection of the optical axis and the first optical surface. Similarly, the plane of the second optical surface is orthogonal to the second surface normal vector and contains the point of intersection of the optical axis and the second optical surface. Where the first optical surface and the second optical surface are plane surfaces, as they are for examples used herein, they will coincide with the plane of the first optical surface and the plane of the second optical surface, respectively. A prism element is further defined as an optical element wherein the plane of the first optical surface and the plane of the second optical surface are non-parallel plane that intersect in a vertex line to form a vertex angle. The vertex angle of the prism element is the angle between the plane of the first optical surface and the plane of the second optical surface measured perpendicular to the vertex line in the sector containing the transmissive material of the prism element. The vertex angle is also equal to 180 degrees minus the angle between the first surface normal vector and the second surface normal vector. A vertex angle is considered positive herein if the corresponding vertex line lies on the positive-Y side of the optical axis and is considered negative herein if the vertex line lies on the negative-Y side of the optical axis.

"Anamorphic Prism Element" and "Beam Compression Factor" Defined

An anamorphic prism element is a prism element configured to compress or expand a cross-sectional dimension of an input light beam. A "beam compression factor" quantifies the amount of such beam compression or expansion and determines the ratio of a first diameter of a collimated beam before passing through the prism element to a second diameter of the collimated beam after passing through the prism element. More specifically, the beam compression factor determines the ratio of a first diameter of a collimated beam measured prior to the first optical surface of the prism element in a direction perpendicular to the optical axis in the plane of incidence at the first surface, to a second diameter of the beam measured after the second optical surface of the prism element in a direction perpendicular to the optical axis in the plane of incidence at the surface. A beam compression factor greater than one indicates that an incident beam parallel to the optical axis will be compressed by the prism element, and a beam compression factor less than one indicates that such a beam will be expanded in passing through the prism element.

Although examples used herein show prism elements and prism groups arranged to compress an input beam, an anamorphic prism element or prism group can alternatively be arranged to expand an input beam.

"Angle of Incidence" and "Angle of Refraction" and their Sign Conventions Defined Keeping in mind that the optical axis direction corresponds with a real ray direction before and after refraction at an optical surface, an "angle of incidence" at an optical surface is an angle between the surface normal and the optical axis prior to refraction at the surface and has a magnitude between zero and 90 degrees. Correspondingly, an "angle of refraction" at an optical surface is an angle between the surface normal and the optical axis after refraction at the surface and also has a magnitude between zero and 90 degrees. For purposes of calculation herein, an angle of incidence is considered to be positive if a clockwise rotation of the optical axis before refraction about the X direction of less than 90 degrees will align the optical axis with the surface normal. Similarly, an angle of refraction is considered to be positive if a clockwise rotation of the optical axis after refraction about the X direction of less than 90 degrees will align the optical axis with the surface normal. By this convention, a ray having a positive angle of incidence will also have a positive angle of refraction. By extension, negative angles of incidence and refraction require a counter-clockwise rotation of the corresponding optical axes of less than 90 degrees to align them with the surface normal.

Calculating "Beam Compression Factor"

The beam compression factor C for a prism element in an optical system can be calculated knowing the optical geometry of the prism element and the refractive index of the optical material used to construct the prism element. Using the following optical geometry parameters (some of which are shown in FIG. 4B) as input values to the calculation:

$\Theta_1$=angle of incidence at first prism element surface

V=prism element vertex angle n=refractive index of prism material at nominal emitter wavelength $$C = C_1 \cdot C_2$$

Where:

C=beam compression factor to be calculated for the prism element.

$C_1 = \cos \Theta_1 / \cos \Theta_1'$ =compression factor at surface 1

$$\cos \Theta_1' = \sqrt{(1-(1/n^2) \cdot \sin^2 \Theta_1)}$$

$C_2 = \cos \Theta_2 / \cos \Theta_2'$ =compression factor at surface 2

$\Theta_2 = \sin^{-1}(n \cdot \sin \Theta_1) - V$ $\Theta_2' = \sin^{-1}(n \cdot \sin \Theta_2)$ "Beam Compression Factor" Defined for a Prism Group A beam compression factor for a prism group determines the ratio of a collimated beam diameter measured perpendicular to the optical axis at the input of the prism group to a diameter of the beam measured perpendicular to the optical axis at the output of the prism group. Where the vertex lines of the prism elements in a prism group are parallel, the beam diameters are measured perpendicular to the vertex lines and a compression factor for a group of N prism elements can be determined as follows:

$$C = C1 \cdot C2 \cdot C3 \ldots CN$$

Where the compression factor for each prism elements is calculated as described above.

"Smile Value" Defined for a Prism Element

Each surface of an anamorphic prism element contributes to a smile error produced by the element and correspondingly to the smile value of the prism element. The smile value of each prism element in a prism group contributes to the smile value of the group, and the smile value of a prism group in a prism system contributes to the smile value of the prism system. Smile errors are errors in beam direction and are most directly and most usefully determined in angular units. Where an anamorphic prism system is included in an optical system that is used to form an image of a light emitter, such as the optical system of a printing device, the smile error in linear units (e.g., millimeters or micrometers) can be determined. For example, in the case of an anamorphic prism system used in a collimated beam, the Y-direction smile error in linear units in the focal plane of a scan lens can be determined by multiplying the tangent of the Y-direction smile error (in angular units) by the effective Y-direction focal length of the scan lens.

Although a value for the X-direction field angle H is needed to calculate a quantitatively-correct smile value for a particular optical system, the value of H is a property of the optical system in which the prism system is used rather than a property of the prism system itself. Accordingly, for calculation or design purposes it may be desirable to set H to a constant (such as 1 degree), allowing the design of a smile-corrected prism system without regard for the object field angle of the overall optical system. Smile error is a second-order function of H for the field angles of interest in printing systems and most other optical systems of interest herein, allowing this substitution to be made without loss of accuracy or generality. For many optical systems, including many printing systems, the tangent of the X-direction field angle H is the ratio of the maximum radial extent of the emitter in the X-direction to the focal length of a collimator lens used to collimate beams from the emitter.

The following mathematical procedure is used to determine a smile value for a prism element. For convenience in determining the magnitude and effect of smile errors at the output of an optical system, the resulting smile value is expressed as the tangent of an angular smile error. More particularly, the smile value is expressed as the tangent of the Y-component of the angular smile error for a prism element having a vertex line parallel to the X-direction.

A "smile value" can be calculated for a prism element using the following optical system parameters as inputs to the calculation:

$\Theta_1$=angle of incidence at first prism element surface

V=prism element vertex angle n=refractive index of prism material at nominal emitter wavelength H=X-direction field angle of emitter (determined at prism location)

The calculation of a smile value for a prism element having a first and a second optical surface proceeds as follows:

$$S = S1 \cdot C2 + S2$$

Where:

S=Smile value to be calculated for the prism element. S is the tangent of the angular smile error at the output of the prism element.

S1=smile value for first surface=tangent of smile error (in air) for surface 1.

C2=beam compression factor at surface 2, calculated as described above.

S2=smile value for second surface.

S1 is calculated as follows:

$$S1 = n \cdot Y \cdot \cos \Theta 1' / (L + Y \cdot \sin \Theta 1')$$

$$Y = Yb - Ya$$

$$Yb = (1/n) \cdot \sin \Theta 1 \cdot \cos H$$

H=X-direction angular field of emitter at input-side of prism element.

$$Ya = K \cdot \tan \Theta 1'$$

$$A = (1/n) \cdot \sqrt{(\sin 2\Theta 1 \cdot \cos 2H + \sin 2H)}$$

$$K = \sqrt{(1 - A2)}$$

$$L = K / \cos \Theta 1'$$

$$\Theta 1' = \sin{-1}((1/n) \cdot \sin \Theta 1)$$

$$C1 = \cos \Theta 1 / \cos \Theta 1' = \text{Compression factor at surface 1}$$

where: $\cos \Theta 1' = \sqrt{(1-(1/n2) \cdot \sin 2\Theta 1)}$

S2 is calculated in a similar manner as S1, with the following substitutions for the input parameters:

$\Theta 2$ is substituted for $\Theta 1$ where: $\Theta 2 = \Theta 1' - V$

Where V is the prism element vertex angle. V is positive when the vertex of the first and second optical surfaces of the prism is on the positive Y side of the optical axis and negative when this vertex is on the negative Y side of the optical axis.

H2 is substituted for H, where: $H2 = \sin{-1}((1/n) \cdot \sin H)$

After making these substitutions, $S_2$ is calculated as follows:

$$S2 = Y \cdot \cos \Theta 2' / (L + Y \cdot \sin \Theta 2')$$

$$Y = Yb - Ya$$

$$Yb = n \cdot \sin \Theta 2 \cdot \cos H2$$

$$Ya = K \cdot \tan \Theta 2'$$

$A = n \cdot \sqrt{(\sin 2\Theta 2 \cdot \cos 2H2 + \sin 2H2)}$ $K = \sqrt{(1-A2)}$ $L = K/\cos \Theta 2'$ $\Theta 2' = \sin^{-1}(n \cdot \sin \Theta 2)$ And, as previously defined:

$C2 = \cos \Theta 2/\cos \Theta 2' =$ compression factor at surface 2

$\theta 2 = \sin^{-1}(n \cdot \sin \Theta 1) - V$ $\Theta 2' = \sin^{-1}(n \cdot \sin \Theta 2)$ Note that in the calculation of $S_2$, the values of intermediate variables such as Y, $Y_b$, $Y_a$, K, L, and A are redefined during the calculation and do not generally assume the values they had as in the calculation of $S_1$. If the prism element is immersed in a surrounding medium other than air, wherein the refractive index of that medium is $n_m$ and the refractive index of the prism is $n_g$, then the above equations apply when $n_g/n_m$ is substituted for n.

Just as a smile value can be calculated for a prism element, a smile value can also be calculated for a prism group or for a prism system comprising multiple prism groups. If a prism group comprises a first prism element and a second prism element, wherein the prism elements have smile values S1 and S2, respectively, and compression factors C1 and C2, respectively, the resultant smile value for the group is S, where:

$S = S1 \cdot C2 + S2$

And, as previously described, the resultant beam compression factor for the group is C, where:

$C = C1 \cdot C2$

Similarly, if a prism system comprises a first prism group and a second prism group, wherein the prism groups have smile values Sg1 and Sg2, respectively, and compression factors Cg1 and Cg2, respectively, the resultant smile value for the system is Ss, where:

$Ss = Sg1 \cdot Cg2 + Sg2$

And, as previously described, the resultant beam compression factor for the system is Cs, where:

$Cs = Cg1 \cdot Cg2$

By beginning the calculation at the first prism element at the input side of a prism group or at the first prism group at the input side of a prism system, and progressing toward the output side of the group or system, a smile value and a beam compression factor can readily determined for the group or system.

Although smile values can be determined for prism elements and prism groups as described above, it is frequently useful to consider smile to be a property of a group of light beams. In much the same way that smile errors can be identified as linear displacement errors between focused image spots, it is meaningful to consider smile errors as angular errors between light beams. The smile values described above for various prisms are the tangents of the angular smile error between a beam originating at an on-axis emitter and one originating at an emitter at the maximum X-radius of the emitter array. Accordingly, the smile values described herein are the tangents of the angular errors between the light beams used to quantitatively define smile.

To maintain high wavefront quality in light beams passing through an anamorphic prism system, such a system is ordinarily used in an afocal configuration. The term "afocal" indicates that beams entering and leaving the prism system are collimated or nearly collimated. In an afocal portion of an optical system, the pointing direction of a beam determines the position of the corresponding focused spot in an image plane where the beam is subsequently brought to focus by a lens or other focusing element. Thus, the pointing directions of beams passing through an anamorphic prism system determine the geometry of focused spots at an image surface such as a photoconductor. Beam pointing directions are normally defined in terms of angles between beam axes and the axis directions of a reference coordinate system and are appropriately specified in units of degrees or radians, or by their sines, cosines or tangents. Similarly, beam-pointing-errors introduced by a prism system in an afocal configuration are angular errors and are also appropriately specified in the angular units of degrees or radians, or by their sines, cosines or tangents. For certain beam pointing errors, including errors due to smile, the beam pointing error may be a vector component of a beam pointing direction in a particular coordinate direction. In such cases, the beam pointing direction can be treated as a vector and resolved into angular vector components along the directions of interest, ordinarily the axis directions of the reference coordinate system, using existing methods of vector analysis. In the same way that the pointing direction of a collimated beam is converted by a lens into the position of a focused spot at an image surface, an error in the pointing direction of a collimated beam is converted into an error in the position of the resulting focused spot when such a beam is brought to focus by a lens.

Figure 4C:
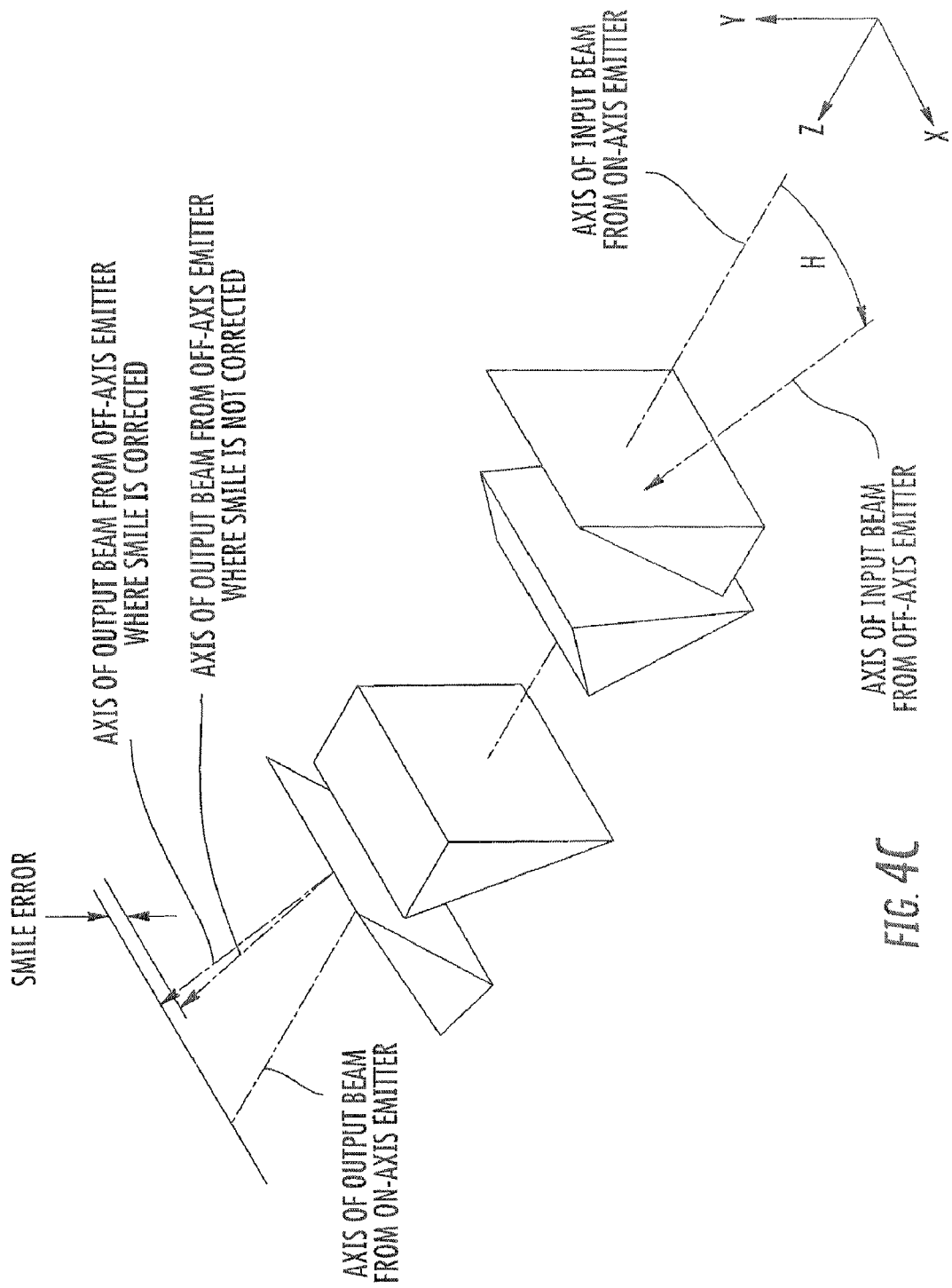
FIG. 4C is a perspective view of a prism system according to an example embodiment.

FIG. 4C illustrates an example prism system having an optical axis direction in the Z-direction of the reference coordinate system and having a direction of greatest beam compression in the Y-direction. The axis of an input beam entering the prism system from an off-axis emitter is angularly displaced from the Z-axis by a field angle H in an XZ plane. The axis of the corresponding output is angularly displaced from the Z-axis in the XZ plane by a similar amount. In the presence of smile, the axis of the output beam will also have an angular component in the orthogonal YZ plane, which is the beam pointing error due to smile. The tangent of this angular component is the smile value S. When the field angle H is set to a specified value, the smile value can be used as a numerical measure of the amount of smile introduced by the prism system. In particular, a numerical smile value "NS" is used herein as a quantitative measure of the smile produced by a prism system. NS is defined at the operating wavelength of the system as the smile value when the field angle H is set to 0.010000 radians (equal to 0.572939 degrees). For this value of H, the tangent of Hx also has a value of 0.010000, making it computationally convenient as well as representative of field angles used in some commercial printing systems. It is understood that an XZ plane is parallel to the X and Z axes of the reference coordinate system, and a YZ plane is similarly parallel to the Y and Z coordinate axes. For the purposes of this disclosure, it is also understood that the pointing direction or pointing angle of a beam is the direction or angle of the central ray of that beam.

As defined herein, NS is the tangent of the component of the beam pointing angle in the direction of maximum beam compression for a beam entering a prism system in a plane orthogonal to the direction of maximum beam compression at an angle of 0.010000 radians with respect to the axial ray of an on-axis beam. The NS value thus represents the amount of smile a prism system will produce for a standardized input beam geometry at the operating wavelength of the optical system.

NS values can be calculated for a prism system using the equations, parameters and method previously described. Under the conditions described above, $$NS=S1*C2+S2$$

And smile for a prism system is considered to be perfectly corrected when NS=0, and:

$$S1*C2+S2=0 \text{ or, equivalently: } S1*C2=-S2$$

Because such exact equalities cannot generally be achieved in practice, and because it is not ordinarily necessary to reduce smile exactly to zero in a real prism system, the smile produced by a prism system is considered to be well-corrected when the magnitude of the NS value is less than 0.000004. Thus, a practical definition of a well-corrected prism system becomes:

$$ABS(S1*C2+S2)<0.000004 \text{ or, equivalently:}$$

$$S1*C2=-S2+/-0.000004$$

Expressing an angular smile error at the output of a prism system as the tangent of this error simplifies the calculation of a corresponding linear smile error at a beam focus, such as at the array of focused spots formed on a photosensitive surface by a scan lens in a printing system. The linear smile error at such a focus is determined by multiplying NS (the tangent of the smile error) by the effective focal length of the optical components between the prism system and image surface. Thus, for example, an angular smile error having a tangent of 0.00001 in an afocal portion of an optical system before a lens is transformed into a linear smile error of 0.0025 mm when focused by a 250 mm focal length lens.

For electrophotographic printing systems it has been found that a linear smile error in an array of focused spots of less than or equal to 0.001 mm produces acceptable print quality and can be considered to be well-corrected.

A numeric smile value can be determined by: 1) direct measurements of light beams in a working optical system, 2) ray trace analysis of a model of the optical system performed using optical design software such as CodeV, Zemax or OSLO, or 3) numerical calculation using the equations previously presented in this disclosure.

A four-element prism system comprising two prism groups each having two prism elements is capable of simultaneously correcting smile and TCA errors while also providing a desired amount of beam compression and collinear input and output optical axes.

A two-element prism system can be very well corrected for smile and TCA while providing a desired amount of beam compression, if the pointing direction of an input beam axis is permitted to differ from the pointing direction of a corresponding output beam axis. An example of such a system has the following parameters:

Prism#1:
n=Refractive index=1.789783 (Glass type is LASN30)
V=Vertex angle=−11.7697039923253 deg
$\Theta 1$=Incidence angle=22.1660244267501 deg
H=X-direction field angle=0.572939 deg (0.0100000 rad)
Prism #2:
n=Refractive index=1.568916 (Glass type is LF4G34)
V=Vertex angle=19.5562365784662 deg
$\Theta 1$=Incidence angle=−16.0848834590916 deg
H=X-direction field angle=0.572939 deg (0.0100000 rad)
Numeric Smile=−1.20336E-09 (Smile angle=−6.89475E-08 deg)

TCA value=Angular deviation of axial ray from on-axis emitter per nanometer of wavelength shift=−1.23E-06 deg/nm For this example, the output beam direction is deviated 2.80 degrees relative to the input beam direction and both smile and TCA are very well corrected. As shown by FIG. 4D, transverse chromatic aberration causes errors in the vertical position of individual image spots 154 at a photosensitive surface 242 in the presence of errors in the emission wavelength of their corresponding emitters 34. Where position errors due to smile and transverse chromatic aberration are both present, image spots 155 will be vertically displaced relative to line 156, the smile axis. In particular, due to manufacturing variations, emitters 34 (shown in FIG. 2) may emit light or other electromagnetic radiation having slightly different wavelengths. The glass or other optical materials used to construct anamorphic prism elements 44 and 46 ordinarily exhibit dispersion, a variation of refractive index as a function of wavelength. Prism elements 44 and 46 in prism group 26 may be designed to be "achromatic", whereby different glass types having different refractive index and dispersion values are selected for prism elements 44 and 46. Such achromatization of a prism group attempts to minimize variations in the deviation angle of an output beam for differing wavelengths of an input beam. Even when achromatized in this manner, the angular deviation of an output beam may reduced but subject to finite and potentially significant variations for different wavelengths of an input beam. The slightly different wavelengths of the beams of light or other electromagnetic radiation emitted by emitters 34 may thus cause a redirection of the beams by prism group 26. Such redirection of the beams results in errors in the actual Y-position of image spots 155 a long line 156 (the smile axis) or along axis 152 (the axis along which image spots 154 would lie absent smile errors) in the image. As shown by FIG. 4D, transverse chromatic aberration may cause some image spots 155 to be vertically higher and may cause other image spots 155 to be vertically lower. As with smile errors, transverse chromatic aberration errors also cause corresponding variations in scan-line spacing within a swath. This variation in scan line spacing due to chromatic aberration may result in banding in printed output. As a result, such variation in scan line spacing may potentially limit achievable print quality, especially as the number of beams per scan swath increases.

It has been discovered that transverse chromatic aberration errors may be quantified based upon the following identified and discovered relationships. A transverse chromatic aberration value can be calculated for a prism element using the following mathematical procedure. The resulting transverse chromatic aberration value is the angular error (in radians) in the direction of an output ray when the refractive index of the optical material used to construct the prism differs by an amount $\Delta n$ from its nominal value n, due to a change in the wavelength $\Delta \lambda$ of an emitter from the nominal value of the wavelength $\lambda$ of the emitters in an emitter array. More particularly, the transverse chromatic aberration value Y-component of the angular smile error for a prism element having a vertex line parallel to the X-direction.

The following optical system parameters are used as inputs to the calculation of a transverse chromatic aberration value for a prism element:

$\Theta_1$=angle of incidence at first prism element surface
V=prism element vertex angle
n=refractive index of prism material at nominal emitter wavelength
$\Delta n$=change in refractive index of prism material due to wavelength change $\Delta \lambda$ Knowing the glass type or other optical material type used to construct the prism element, the relationship between refractive index and wavelength is readily determined from glass manufacturer's data sheets, or from tabulated refractive index data for the particular material. From such data, a refractive index change Δn corresponding to a wavelength change Δλ can be readily determined.

The calculation of a transverse chromatic aberration value for a prism element having a first and a second optical surface proceeds as follows:

$$T = T1 \cdot C2 + T2$$

Where:

T=transverse chromatic aberration value to be calculated for the prism element. T is the angular transverse chromatic aberration error at the output of the prism element.

T1=transverse chromatic aberration value for first surface=tangent of transverse chromatic aberration value (in air) for surface 1.

C2=beam compression factor at surface 2, calculated as described above.

T2=transverse chromatic aberration value for second surface.

$$T1 = \Delta n \cdot (-1/(n \cdot \sqrt{((n2/\sin 2\Theta 1) - 1)}))$$

$$\Theta 2 = \sin^{-1}(n \cdot \sin \Theta 1) - V$$

$$T2 = -\Delta n \cdot (1/(n \cdot \sqrt{((1/(n2 \cdot \sin 2\Theta 2)) - 1)}))$$

$$T = T1 \cdot C2 + T2$$

TCA Value Calculation Extended to Prism Groups and Systems

Just as a transverse chromatic aberration value can be calculated for a prism element, a transverse chromatic aberration value can also be calculated for a prism group or for a prism system comprising multiple prism groups. If a prism group comprises a first prism element and a second prism element, wherein the prism elements have transverse chromatic aberration value T1 and T2, respectively, and compression factors C1 and C2, respectively, the resultant transverse chromatic aberration value for the group is T, where:

$$T = T1 \cdot C2 + T2$$

And, as previously described, the resultant beam compression factor for the group is C, where:

$$C = C1 \cdot C2$$

Similarly, if a prism system comprises a first prism group and a second prism group, wherein the prism groups have transverse chromatic aberration values Tg1 and Tg2, respectively, and compression factors Cg1 and Cg2, respectively, the resultant transverse chromatic aberration value for the system is Ts, where:

$$Ts = Tg1 \cdot Cg2 + Tg2$$

And, as previously described, the resultant beam compression factor for the system is Cs, where:

$$Cs = Cg1 \cdot Cg2$$

Because the transverse chromatic aberration contributions of each prison element may be identified and quantified using the above discovered relationships, prism elements may be selected, constructed or arranged so as to cooperate with one another to eliminate transverse chromatic aberration errors or reduce the overall transverse chromatic aberration errors of a prism system. Transverse chromatic aberration produced by a prism system is considered to be well-corrected when the pointing direction of an output beam changes as a function of the wavelength of the beam at a rate of 0.000002 radians/nm (equivalent to 0.000115 degrees/nm), or less. Transverse chromatic aberration in electrophotographic printing systems that results in a focused spot position error at an image surface having a magnitude of 0.0005 mm/nm of wavelength change, or less, has been determined to produce acceptable print quality and represents a well-corrected system.

As in the case of smile, transverse chromatic aberration can be determined by: 1) direct measurements of light beams in a working optical system, 2) ray trace analysis of a model of the optical system performed using optical design software such as CodeV, Zemax or OSLO, or 3) numerical calculation to determine the rate of change in output beam pointing direction as a function of wavelength, where the refractive index of each prism element is a function of wavelength, as is well known in the art of optical design.

Overall, using the above discovered relationships, two or more prism elements of a prism system may be customized to cooperate with one another such that the collective result of the two or more prism elements is an acceptable level of smile error and an acceptable level of transverse chromatic aberration error. In particular embodiments, the prism system may reduce such smile errors and transverse chromatic aberration errors while including just two prism elements (each prism group consisting of a single prism element). By reducing the number of prism elements in a prism system, costs may be reduced.

One particular arrangement for reducing smile error and transverse chromatic aberration error y is an arrangement in which substantially similar prism groups of two or more prism elements are rotated with respect to one another such that they smile and transverse chromatic aberration errors collectively introduced by one group of prism element is substantially canceled out by the smile error and transfer of chromatic aberration error of another group. In particular, an anamorphic prism group is configured to cause a one-directional compression or expansion of an input beam. Where the input beam is collimated and has a circular cross-section, it is transformed by the prism group into an output beam having an elliptical cross-section. The output beam diameter in a cross-sectional plane (i.e., a plane perpendicular to the output optical axis) will be decreased in the direction of the minor axis of the elliptical output cross-section where the beam compression factor C for the prism group is greater than one, but will be substantially unaltered in the orthogonal direction. Correspondingly, the output beam diameter in a cross-sectional plane will be increased in the direction of the major axis of the elliptical output cross-section where the beam compression factor C for the prism group is less than one but, again, the beam diameter will be substantially unaltered in the orthogonal direction. An anamorphic prism group has a rotational position with respect to rotation about an optical axis. The optical axis direction is the Z-direction, as previously defined, and a the rotational position of a prism group is a direction in an XY plane parallel to the direction of the greatest change in the diameter of a collimated circular input beam. For an anamorphic prism group that compresses an input beam (i.e., C>1), the rotational position of the group is parallel to the direction of greatest beam compression (the minor axis of the ellipse described above) and points in the direction that the optical axis is shifted at the output side of the group relative to the optical axis position at the input side of the group. An anamorphic prism group that expands an input beam (i.e., C<1), the rotational position of the group is parallel to the direction of greatest beam expansion (the major axis of the ellipse described above) and, again, points in the direction that the optical axis is shifted at the output side of the group relative to the optical axis position at the input side of the group. For example, inspection of the ray paths of FIGS. 1A and 1B shows that the axis shift direction for prism group 26 is the negative Y direction and the axis shift direction for prism group 28 is the positive Y direction. In this example, the difference in the rotational position of the first group 26 and the rotational position of the second group 28 with respect to optical axis is shown to be 180 degrees. When the difference between the rotational positions of a first and second prism group about an optical axis is in the range of 180+/−45 degrees, one of prism group is described as being "inverted" with respect to the other. In particular, anamorphic prism group 28, in this example, is regarded as inverted with respect to anamorphic prism group 26 when the magnitude of the difference in the rotational positions of the prism groups is greater than or equal to 135 degrees and less than or equal to 225 degrees In an embodiment illustrated in FIG. 1, smile and transverse chromatic aberration are corrected in a prism system comprising a first prism group 26 and a second prism group 28 wherein prism elements comprising the first group are substantially identical to corresponding prism elements comprising the second group. In the example of FIG. 1, prism element 44 is substantially identical to prism element 54 in both vertex angle and optical material type and prism element 46 is substantially identical to prism element 56 in both vertex angle and optical material type. Prism elements 44 and 46 are arranged within prism group 26 in a similar, though generally not identical, manner to the arrangement of prism elements 54 and 56 within prism group 28. The rotational position of prism group 28 with respect to rotation about the optical axis differs, however, by substantially 180 degrees from the rotational position of prism group 26, making prism group 28 inverted with respect to prism group 26. In this embodiment, the particular rotational orientation of prism elements 44 and 46 within group 26 and the particular rotational orientation of prism elements 54 and 56 within prism group 28 are adjusted with respect to rotation about an X-direction substantially parallel to the vertex lines of the prism elements in order to achieve one or more of:

1) a desired beam compression factor,
2) a desired smile value,
3) a desired transverse chromatic aberration value,
4) an output optical axis that coincides in position and/or angle with an input optical axis, and
5) a minimum number of unique production parts.

Although anamorphic prism 28 may introduce smile and transverse chromatic aberration errors, such errors generally have an opposite algebraic signs as compared to the corresponding errors introduced by prism group 26 and can generally be compensated by adjusting the rotational orientation of prism elements 44 and 46 within group 26 and the rotational orientation of prism elements 54 and 56 within prism group 28 by rotation about their vertex lines (in an X-direction). More specifically, smile errors are equal in magnitude and opposite in sign when the smile value for the second prism group Sg2 is equal in magnitude and opposite in sign to the product of the smile value for the first prism group Sg1 and the compression factor for the second prism group Cg2, as disclosed herein. Thus, smile errors are minimized when:

$$Sg2 = -Sg1 \cdot Cg2$$

Similarly, transverse chromatic aberration errors are equal in magnitude and opposite in sign when the transverse chromatic aberration value for the second prism group Tg2 is equal in magnitude and opposite in sign to the product of the transverse chromatic aberration value for the first prism group T1 and the compression factor for the second prism group Cg2, as also disclosed herein. Under these conditions, the transverse chromatic aberration errors for the prism system, as represented by Ts are minimized:

$$Ts = Tg1 \cdot Cg2 + Tg2$$

The effects of prism groups 26 and 28 on position errors in the array of image spots at an image surface such as surface 242 in FIG. 11, as determined by optical ray trace analysis, are shown in FIGS. 5-10.

Anamorphic prism group 28 comprises a group of two or more anamorphic prism elements configured to receive light beams from anamorphic prism group 26 and to further direct such light beams towards photosensitive surface 242. In the example illustrated, prism group 28 includes prism elements 54, 56. Prism elements 54 and 56 are supported or oriented with their optical vertices 58 (the intersection of input and output faces) on opposite sides of the optical axis. As a result, prism elements 54 and 56 further compress the collimated beams of light from optics 24 without altering the beam dimension in an orthogonal direction (into the page as seen in FIG. 1) while maintaining parallelism between input and output optical axes. At the same time, each prism element 54 and 56 has an associated beam compression factor and contributes to the overall beam compression applied to the beams to reduce or correct beam ellipticity.

Anamorphic prism groups 28 also corrects or at least partially reduces the aforementioned smile and transverse chromatic aberration errors introduced by prism group 26.

Figure 5:
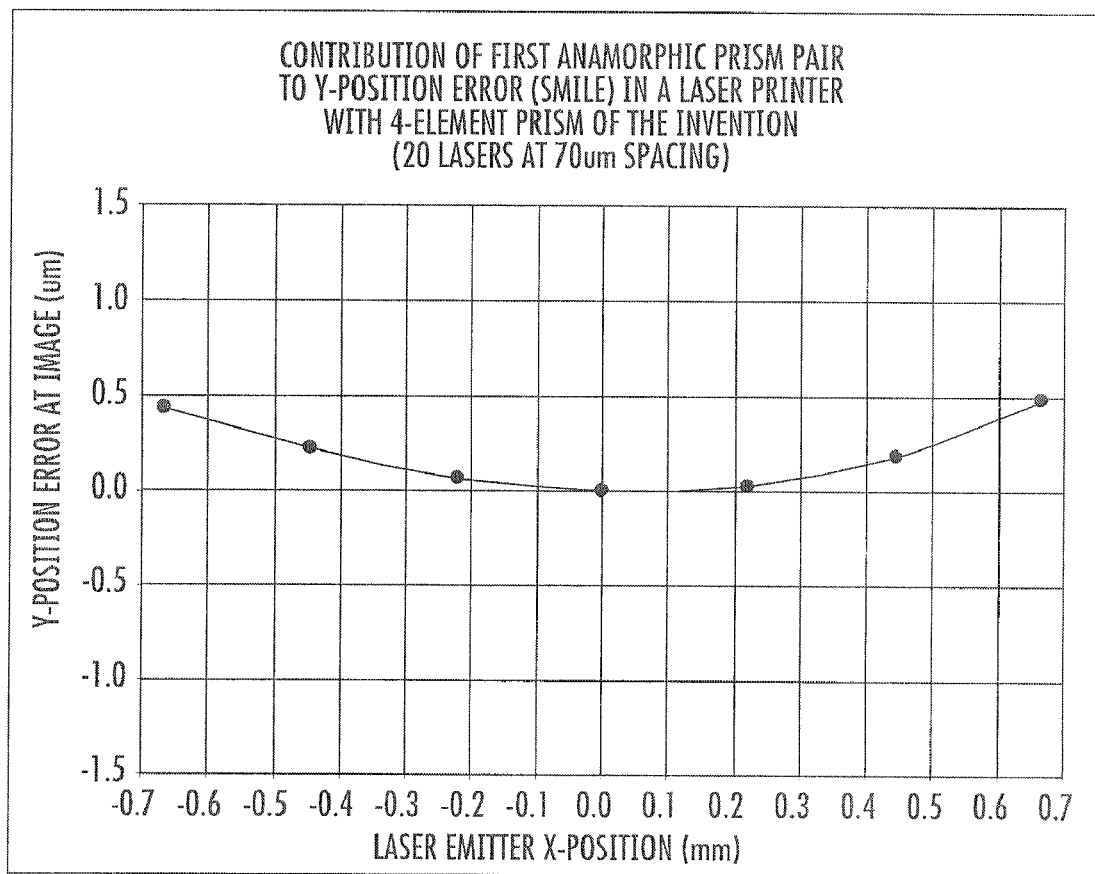
FIG. 5 is a graph illustrating smile errors contributed by a first prism group of the system of FIG. 1 according to an example embodiment.
Figure 6:
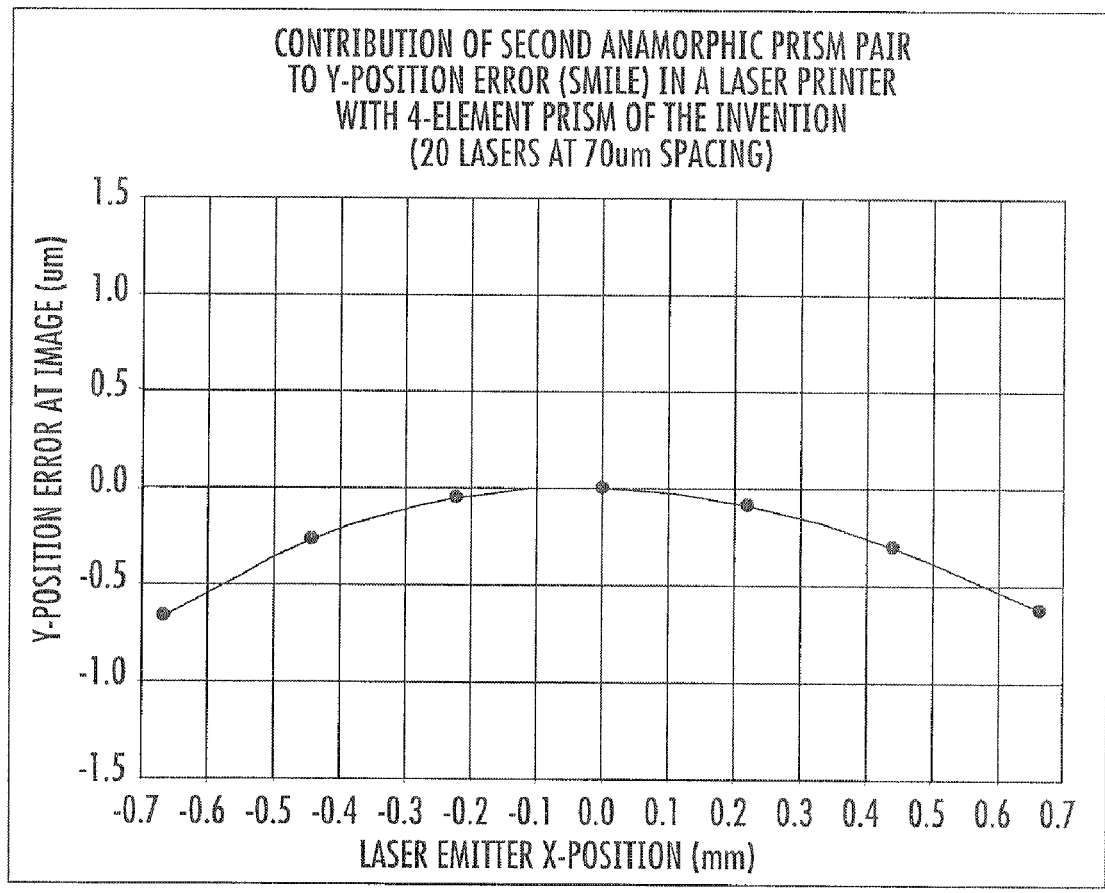
FIG. 6 is a graph illustrating smile errors contributed by a second prism group of the system of FIG. 1 according to an example embodiment.
Figure 7:
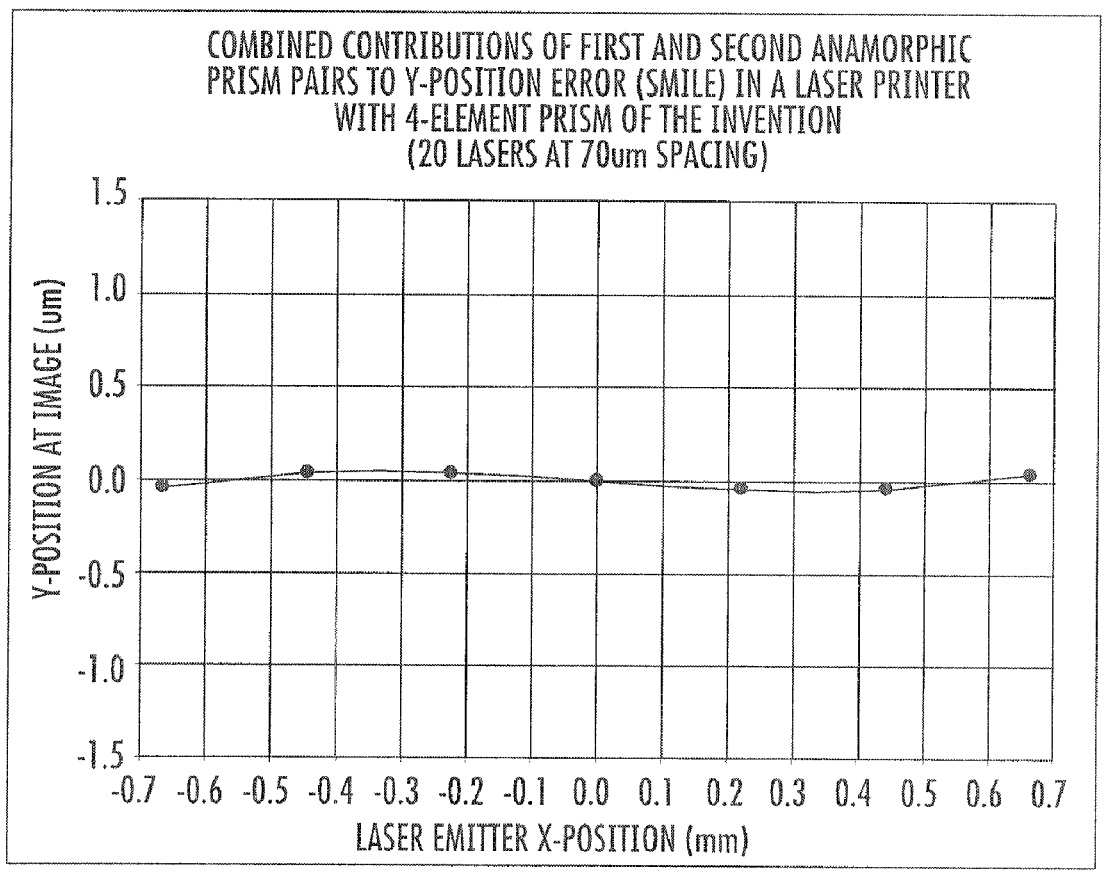
FIG. 7 is a graph illustrating a combination of the smile errors contributed by the first prism group and second prism group of the system of FIG. 1 according to an example embodiment.

FIGS. 5-7 graphically illustrate the smile correction achieved by anamorphic prism group 28. The smile errors graphically shown in FIGS. 5-7 are those at the array of image spots in a final image on exposed surface 242 in FIG. 11. FIG. 5 graphically illustrates smile errors introduced by the example anamorphic prism group 26 in the absence of prism group 28. In particular, FIG. 5 is a graphic representation of the difference between the actual positions of image spots and their ideal positions, measured in a cross-scan direction and plotted as a function of emitter position within the array 22 (shown in FIG. 2). FIG. 5 illustrates the contribution of smile (Y-position error) from prism group 26 before it is resealed by the compression factor of prism group 28 in a system having an emitter array with 20 emitters having a spacing 36 (shown in FIG. 2) of 70 μm.

As shown by FIG. 5, anamorphic prism group 26 introduces a peak-to-peak smile error of about +0.5 μm. In embodiments where anamorphic prism group 28 is not included and where anamorphic prism group 26 must, by itself, provide the entire amount of beam compression required in the design of the optical system the peak-to-peak smile error introduced by anamorphic prism group 26 may have a significantly larger magnitude. FIG. 5 illustrates the contribution of smile (Y-position error) from prism group 26 in a system having an emitter array with 20 emitters having a spacing 36 (shown in FIG. 2) of 70 μm.

FIG. 6 graphically illustrates smile errors introduced by the example anamorphic prism group 28 in the absence of prism group 26. Like FIG. 5, FIG. 6 is a graphic representation of the difference between the actual positions of image spots and their ideal positions, measured in a cross-scan direction and plotted as a function of emitter position within the array (such as array 22 shown in FIG. 2). As shown by FIG. 6, the smile introduced by prism group 28 has an opposite algebraic sign compared to the smile introduced by prism group 26, as indicated by the downward curvature of FIG. 6 compared to the upward curvature of FIG. 5. In the example illustrated, the smile errors introduced by anamorphic prism group 28 have a peak-to-peak smile error of approximately −0.65 μm. Prism group 28 also has a beam compression factor of approximately 1.3. The smile errors shown in FIGS. 5 and 6 for prism groups 26 and 28 in an example system are proportional to the smile values calculated for these prism groups using the calculation methods disclosed herein. Accordingly, for this example:

$$Sg1=(1/F)\cdot 0.5 \text{ um}$$

$$Sg2=-(1/F)\cdot 0.65 \text{ um}$$

$$Cg2=1.33$$

Where F represents the focal length of the lens used to image the beams, and 1/F is an appropriate proportionality factor for converting a measured linear smile error at an image plane in this example to an angular smile value for a prism group. The above values for Sg1, Sg2 and Cg2, satisfy the condition for smile correction:

$$Sg2=-Sg1\cdot Cg2$$

and, as graphically illustrated in FIG. 7, the smile introduced by prism group 28 effectively cancels the smile errors introduced by prism group 26. The combined smile errors introduced y the example anamorphic prism groups 26 and 28, when used in combination, show nearly complete cancellation of smile as evidenced by the near elimination of the second-order component of the curve in FIG. 7. The residual smile in this example is substantially less than 10% of the smile of contributed by prism group 26 or prism group 28 acting alone. Like FIG. 5, FIG. 7 is a graphic representation of the difference between the actual positions of image spots and their ideal positions, measured in a cross-scan direction and plotted as a function of emitter position within the array (such as array 22 shown in FIG. 2). FIG. 7 illustrates the combined contributions of smile (Y-position error) from prism groups 26 and 28 in a system having an emitter array with 20 emitters having a spacing 36 (shown in FIG. 2) of 70 μm.

Figure 8:
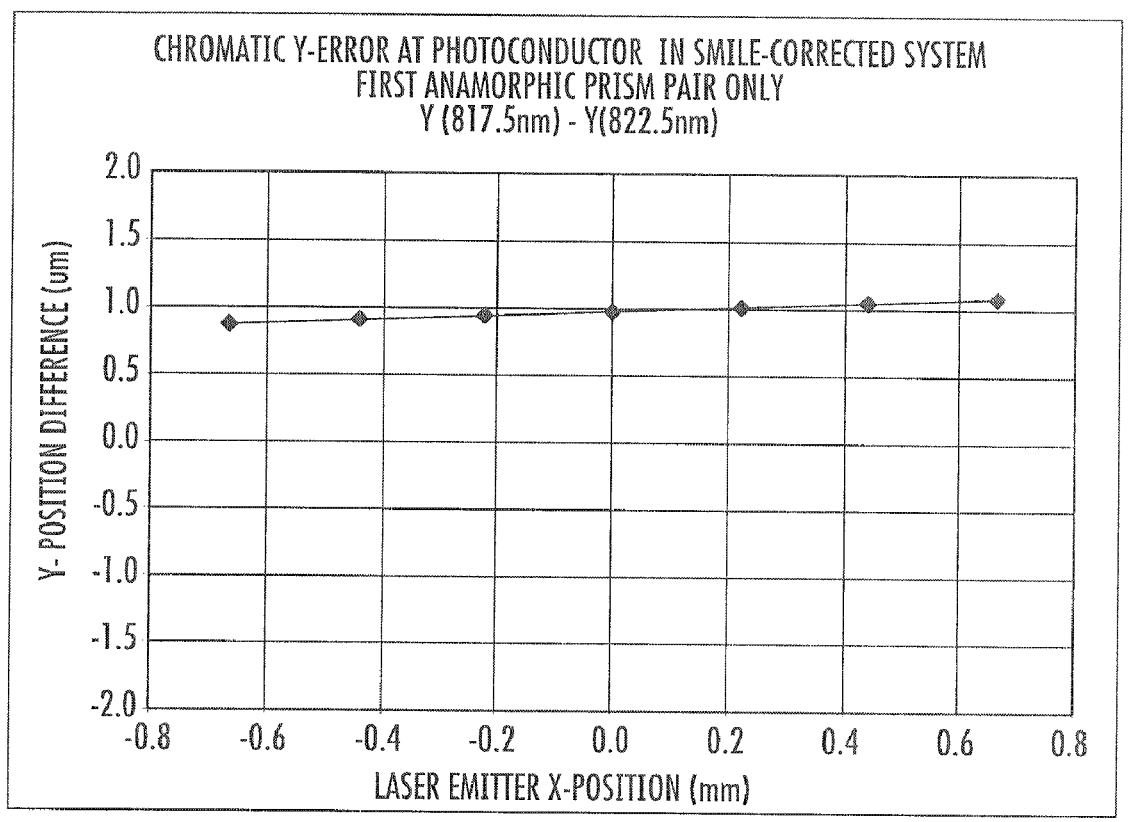
FIG. 8 is a graph illustrating TCA errors contributed by a first prism group of the system of FIG. 1 according to an example embodiment.
Figure 9:
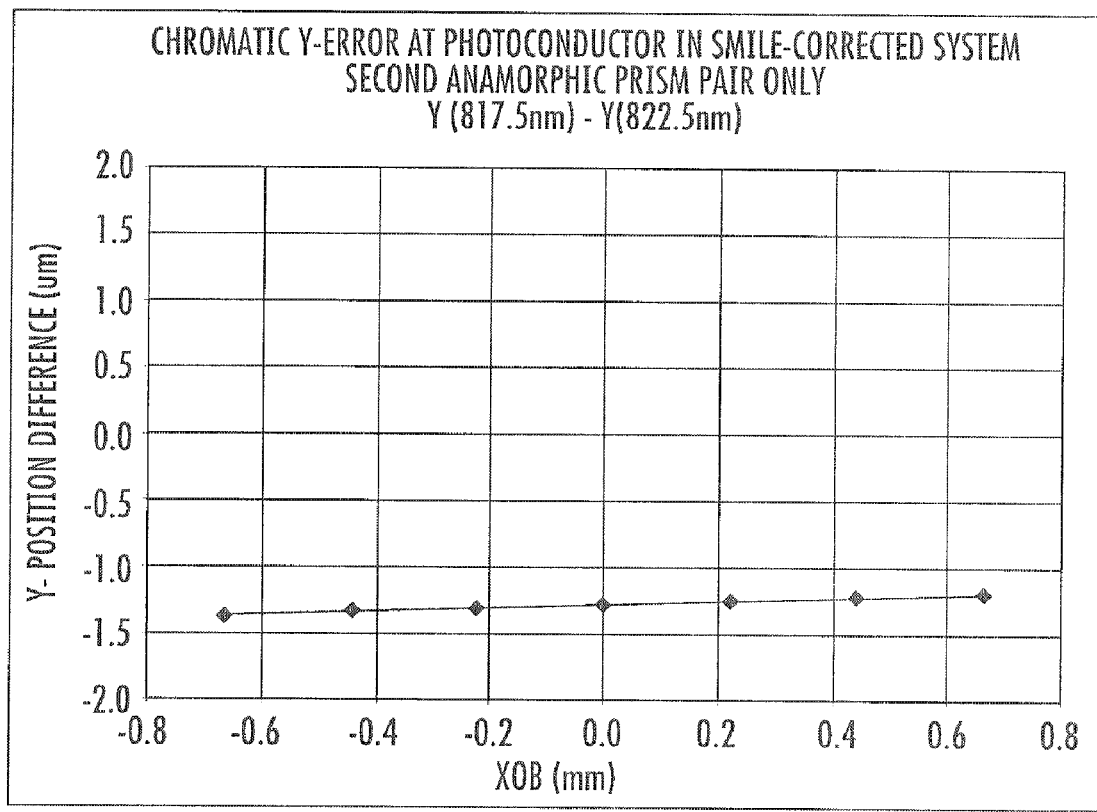
FIG. 9 is a graph illustrating TCA errors contributed by a second prism group of the system of FIG. 1 according to an example embodiment.
Figure 10:
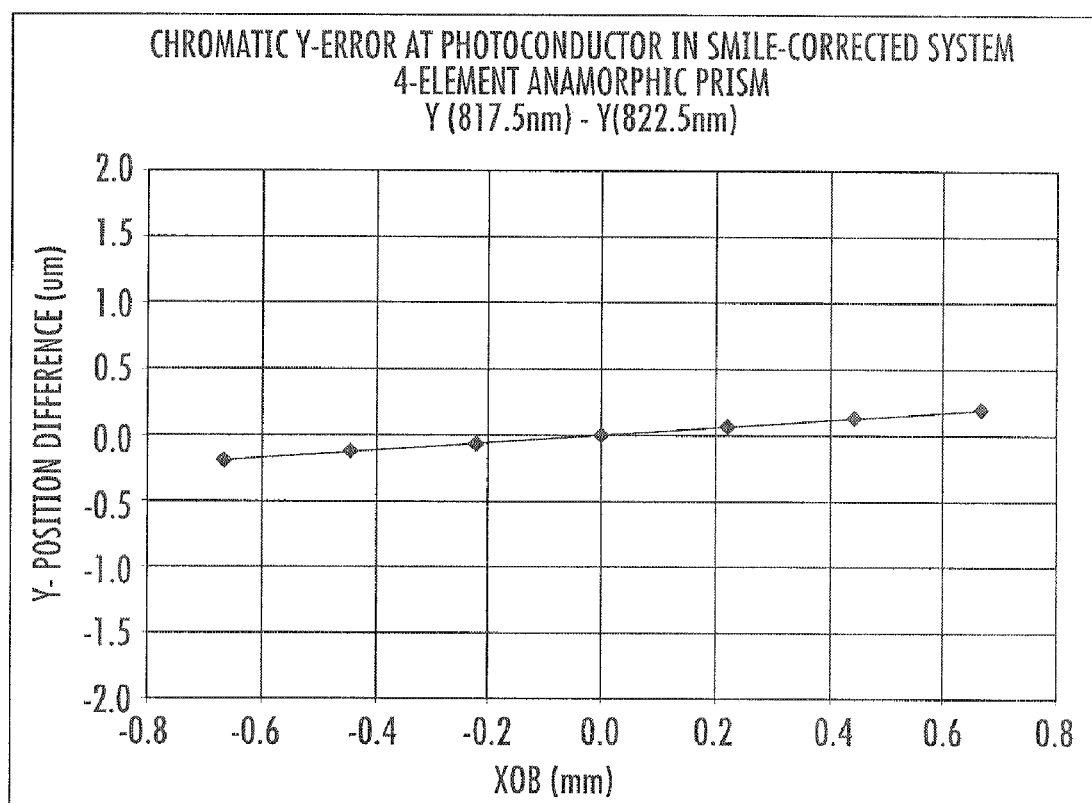
FIG. 10 is a graph illustrating a combination of the TCA errors contributed by the first prism group and second prism group of the system of FIG. 1 according to an example embodiment.

FIGS. 8-10 graphically illustrate the transverse chromatic aberration (TCA) error correction achieved by anamorphic prism group 28. FIGS. 8-10 illustrate chromatic error introduced by prism groups 26 and 28 with chromatic error contributed from other sources, such as lenses in the optical system, removed for clarity. The Y-height of the curve for the central emitter at (X=0) is the relevant measure of chromatic aberration in these graphs. In FIGS. 8-10, the X-direction is a scan direction, the Y-direction is a cross-scan direction and the Z-direction is the optical axis direction. The emitter array direction (sometimes also the "slow axis" direction of the emitters) is approximately parallel to the X-direction.

FIG. 8 graphically illustrates TCA errors introduced by the example anamorphic prism group 26. In particular, FIG. 8 is a graphic representation of the difference between the actual positions of image spots and their ideal positions, measured in a cross-scan direction and plotted as a function of emitter position within the array 22 (shown in FIG. 2). FIG. 8 illustrates the contribution of TCA (chromatic Y-position error) from prism group 26 in a system having an emitter array with 20 emitters having a spacing 36 (shown in FIG. 2) of 70 μm. As shown by FIG. 8, anamorphic prism group 26 introduces a Y-position difference of approximately +1.0 μm at the X=0 position for a peak-to-peak wavelength error of 5 nm. In embodiments where anamorphic prism group 28 is not included and where a single anamorphic prism group 26 must, by itself, provide the entire amount of beam compression required in the design of the optical system, the resulting Y-position difference caused TCA for by such a wavelength error could have a significantly larger magnitude.

FIG. 9 graphically illustrates TCA errors introduced by the example anamorphic prism group 28. Like FIG. 8, FIG. 9 is a graphic representation of the difference between the actual positions of image spots and their ideal positions, measured in a cross-scan direction and plotted as a function of emitter position within the array (such as array 22 shown in FIG. 2). FIG. 9 illustrates the contribution of TCA (Y-position error) from prism group 28 in a system having an emitter array with 20 emitters having a spacing 36 (shown in FIG. 2) of 70 μm.

As shown by FIG. 9, the TCA introduced by prism group 28 has an opposite algebraic sign as compared to the TCA errors introduced by anamorphic prism group 26 (shown in FIG. 8). In the example illustrated, anamorphic prism group 28 introduces a TCA error having a Y-position difference of approximate −1.33 m at the X=0 position for a peak-to-peak wavelength error of 5 nm.

The TCA errors shown in FIGS. 8 and 9 for prism groups 26 and 28 in an example system are proportional to the TCA values calculated for these prism groups using the calculation methods disclosed herein. Accordingly, for this example:

$$Tg1=(1/F)\cdot 1.0 \text{ um}$$

$$Tg2=-(1/F)\cdot 1.3 \text{ um}$$

$$Cg2=1.33$$

Where F represents the focal length of the lens used to image the beams, and 1/F is an appropriate proportionality factor for converting a measured linear error at an image plane in this example to an angular TCA value for a prism group. The above values for Sg1, Sg2 and Cg2, satisfy the condition for TCA correction:

$$g2=-Tg1\cdot Cg2$$

and anamorphic prism group 28 introduces a TCA error that effectively compensates or cancels the TCA errors introduced by prism group 26.

FIG. 10 graphically illustrates the combined TCA errors introduced or contributed by the example anamorphic prism groups 26 and 28. Like FIG. 8, FIG. 10 is a graphic representation of the difference between the actual positions of image spots and their ideal positions, measured in a cross-scan direction and plotted as a function of emitter position within the array (such as array 22 shown in FIG. 2). FIG. 10 illustrates the combined contributions of TCA (chromatic Y-position error) from prism groups 26 and 28 in a system having an emitter array with 20 emitters having a spacing 36 (shown in FIG. 2) of 70 μm. As shown by FIG. 10, the TCA introduced by prism group 28 largely cancels out the TCA errors introduced by prism group 26. In particular, the combined chromatic Y-position difference at the X=0 position is corrected to be approximately zero.

Optics 30 receives a multiple light beams from prism groups 26 and 28 and further manipulates a light beams and directs a light beams onto exposed surface 242. A particular example illustrated, optics 30 comprises multiple optical elements such as the illustrated lenses. In other embodiments, optics 30 may have other prism elements or may have other configurations.

Exposure surface 242 comprises a surface configured to be exposed by the multiple beams of light provided by the remaining components of system 20. In one embodiment, exposed surface 242 may be the surface of a photoconductive or otherwise photosensitive member. The photosensitive member may comprise a drum, a belt or other structure. In one embodiment, the exposed surface 242 may be part of an electrophotographic printing system in which dry or liquid toner or other charged printing material is used to form an image based upon an image or pattern of electrostatic charge created by the multiple light beams on exposed surface 242. In other embodiments, exposed surface 242 they be employed as part of other devices in which a photosensitive surface is illuminated and exposed with multiple beams.

As shown in FIG. 1, in one embodiment, a fold mirror 62 may be located between prism group 26 and prism group 28. (For ease of illustration, beam deviation at the fold mirror is not shown) To accommodate mirror 62, prism groups 26 and 28 are spaced by the illustrated distance, in other embodiments, prism groups 26 and 28 may have other spacings. In other embodiments, mirror 62 may be omitted.

Overall, prism group 28 corrects or least partially reduces smile and TCA errors introduced by prism group 26. As a result, there is a reduced variation in scan-line spacing within a swath, more closely approximating the desired results shown in FIG. 3. By reducing the variation in scan-line spacing within a swath, visible banding artifacts may be reduced, improving print quality.

As noted above, in the particular example illustrated, anamorphic prism group 28 is inverted with respect to prism group 26, the rotational positions of prism groups 26 and 28 being 180 degrees apart with respect to rotation about an optical axis. In other embodiments, prism group 28 may be supported at a rotational position that is different from the rotational position of prism group 26 by more or less than less than 180 degrees. For example, the difference in rotational position between prism group 28 and prism group 26 may alternatively be between 135 and 235 degrees.

In the particular example illustrated, anamorphic prism group 28 introduces both a smile error and a TCA error that are opposite in direction and substantially equal in magnitude and to those of prism group 26 after being scaled by the compression factor of prism group 28, as previously disclosed.

More specifically, the prism groups 26 and 28 can be simultaneously optimized using the equations and calculation methods provided herein to mutually compensate the smile and TCA errors introduced by these prism groups, thereby minimizing the magnitude of smile and TCA errors at an image surface and minimizing their contribution to print quality defects when used as a part of an imaging or printing system. As a result, a near complete cancellation of such errors can be achieved. In one embodiment, prism element 44 of prism group 26 is substantially identical to prism element 54 of prism group 28 in both vertex angle and optical material type, and prism element 46 of prism group 26 is substantially identical to prism element 56 of prism group 28 in both vertex angle and optical material type.

In the example illustrated, prism groups 26 and 28 provide a total beam compression factor of approximately 1.70, wherein prism group 26 provides a beam compression factor of approximately 1.28 while prism group 28 provides a beam compression factor of approximately 1.33. In other embodiments, prism group 28 may have a different beam compression factor compared to the beam compression factor of prism group 26. This may be the result of prism elements of prism group 28 being different in one or more characteristics as compared to corresponding prism elements in prism group 26.

Although each of prism groups 26 and 28 is illustrated as having two prism elements, in other embodiments, each of prism groups 26 and 28 may have greater than two prism elements. Although system 22 is illustrated as including two prism groups 26 and 28, in other embodiments, system 22 may include greater than two prism groups. For example, in another embodiment, system 22 may include four prism groups. In such an embodiment, the total beam compression may be apportioned between the four prism groups rather than just two prism groups. In such an embodiment, two of the prism groups may be inverted with respect to the other two prism groups. In other embodiments, the prism elements of a first prism group and the prism elements of a second prism group may differ in number, material type, vertex angle, rotational position, or in other characteristics.

Figure 13:
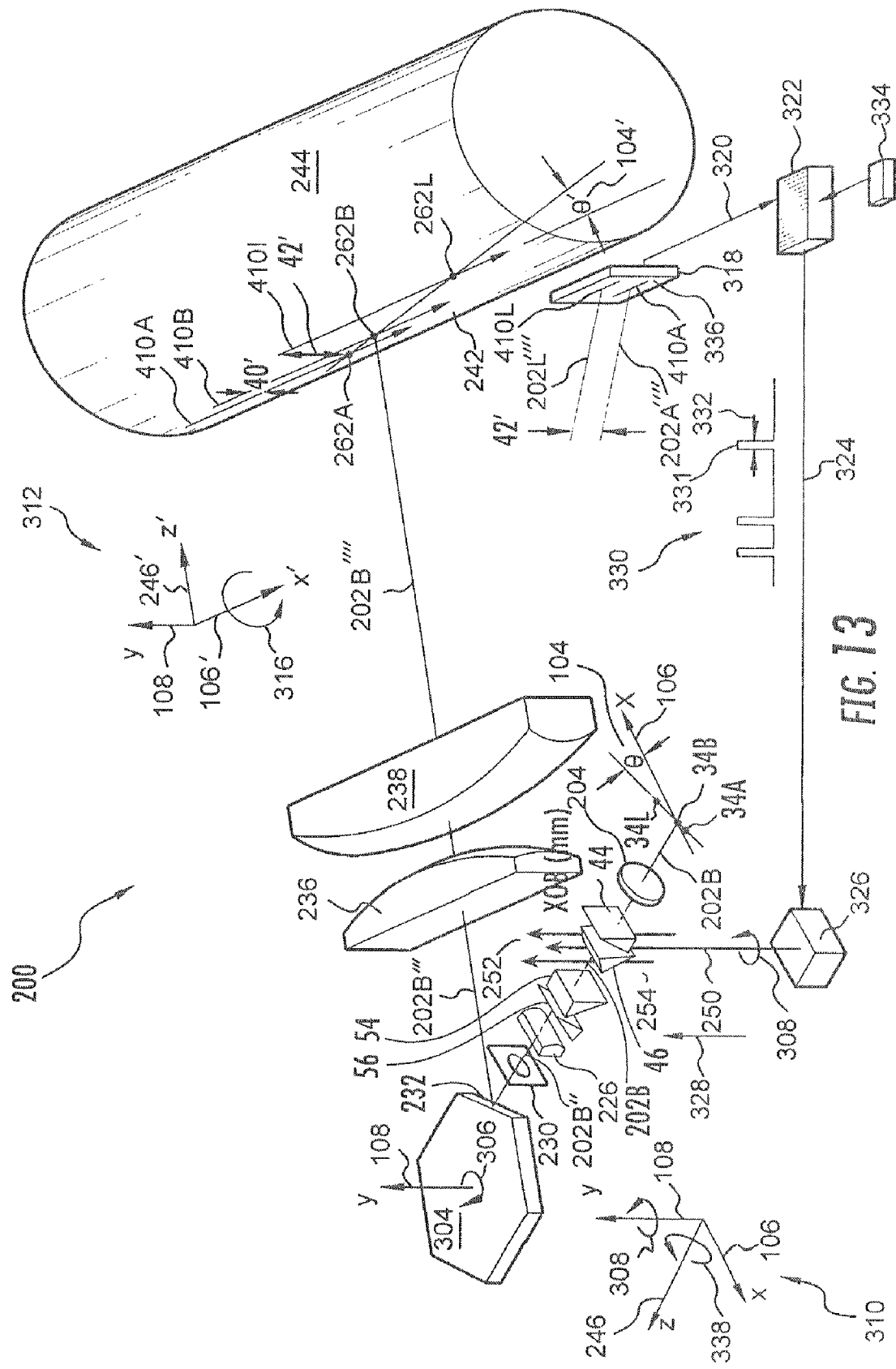
FIG. 13 is a perspective view of the system of FIG. 11 according to an example embodiment.

FIGS. 11-13 illustrate multi-beam exposure system 200 according to an example embodiment. System 200 is similar to system 200 and includes a first prism group 26 and a second prism group 28, wherein the two prism groups cooperate to at least partially reduce or substantially cancel out smile and TCA errors as discussed above. As further noted above, reducing such errors reduces scan-line position errors in a printing system which reduces banding effects and enhances print quality. As will be described hereafter, system 200 additionally provides complementary control over scan line spacing through additional rotational adjustment of at least one of prism elements 44, 46, 54 or 56.

FIG. 12 is an expanded cross-sectional view of the light emitter array 22 showing light sources or emitters 34A, 34B, and 34L. Although, emitters 34C through 34K are not shown in FIG. 12, they are between emitters 34B and 34L as shown in FIG. 12. Adjacent emitters, such as 34A and 34B are separated by a vertical distance 40. The most distant emitters 34A and 34L are separated by a vertical separation 42. The vertical separation of the most distant emitters 34A and 34L determines a vertical separation 42', 42", 42''' (See FIGS. 14, 15, and 16) of spots in an image of the most distant emitters 34A and 34L.

As shown by FIG. 13, emitters 34A, 34B, and 34L are rotated at an angle theta 104 relative to the light emitter array 22 scan axis direction 106 for the purpose of establishing a vertical distance 40' between spots 262A and 262B, and a vertical separation 42' between spots 262A and 262L. Spots 262A and 262L may illuminate a surface 242 of a photosensitive medium 244. Spots 262A through 262L are subsequently referred to as spots 262. A small change in the angle theta 104 can result in a relatively large change in both the vertical distance 40' and vertical separation 42' between spots 262. This sensitivity to the small change in angle theta 104 is undesirable for adjusting the vertical separation 42' because a small change in the angle theta 104 due to thermal stress, shock, vibration, or other factors may significantly change both the vertical distance 40' and vertical separation 42' between the spots 262. Such a change in both the vertical distance 40' and vertical separation 42' between spots 262 can result in undesirable banding in a printed image.

As further shown by FIG. 13, the vertical distance 40' between adjacent spots 262A and 262B is proportional to the vertical distance 40 between adjacent emitters 34A and 34B. A vertical separation 42' between the most distant spots 262A and 262L is proportional to the vertical separation 42 between the most distant emitters 34A and 34L. As will be described hereafter, this vertical separation 42' may be adjusted by rotating or reorienting one or more of prism elements 44, 46, 54 and 56 about one or more axes extending in a vertical direction 108, or about an optical axis direction 246.

FIGS. 11 and 13 illustrate paths of the beams from emitters 34 to surface 242 where spots 262 are formed. FIG. 11 illustrates multiple beam paths from multiple emitters. FIG. 13 illustrate a single ray path from a single beam for clarity. As shown by FIG. 12, light beams 202A, 202B, and 202L are emitted from emitters 34A, 34B, and 34L respectively and travel substantially in the optical axis direction 246. As shown by FIG. 13, light beam 202B (represented in FIG. 13 by a single line corresponding to the central ray of light beam 202B for clarity) travels in the optical axis direction 246 of coordinate system 310 and passes through a collimating element 204. Collimating element 204 may comprise a lens.

Collimating element 204 directs the substantially collimated light beams 206 to prism groups 26 and 28. In particular, light beams 206 pass through prism elements 44 and 46 of prism group 26 and then through prism elements 54 and 56 of prism group 28. The prism groups 26 and 28 are configured to anamorphically compress light beams. At least one of the prism elements of groups 26 and 28 is adapted to compress anamorphically. Anamorphic beam compression is characterized as having a different beam compression in a vertical direction 108 than in a scan axis direction 106. As discussed above, prism group 28 corrects or at least partially reduces smile and TCA errors introduced by prism group 26.

After the light beam 202B passes through prism groups 26 and 28, the light beam 202B is represented by reference number 202B' (again shown as a single line in FIG. 13 for clarity). The light beam 202B' passes through a cylindrical lens 226 to form a light beam 202B" (also represented as a single line in FIG. 13). An aperture 230 defines the cross-section of the beams 202A" through 202L" including the beam 202B", and determines which rays in the beams 202A" through 202L" pass through the optical system 300.

Beam 202B" is focused to a line image on the polygon surface 232 of polygon 304. Focusing light beams 202A' through 202L' (which include light beam 202B') to line images at the polygon 304 surface 232 reduces the effect of the rotational dynamic instability of the polygon 304 on the printing system. Dynamic instability is sometimes called wobble. Focusing each beam 202A' through 202L' to a line image at the polygon surface 232 also reduces the effect of errors in the facet of the polygon 304 on the printing system. After beam 202B" is reflected from the surface 232 of a rotating 306 polygon 304, the stationary beam 202B" is converted into a scanning beam 202B'''. The rotation 306 of the polygon 304 is substantially around an axis in the vertical direction 108 and changes the angular direction of the beam 202B''' in time in the x'-z' plane defined by the scan axis direction 106' and the optical axis direction 246'. Beam 202B''' is illustrated at a time when the beam 202B''' travels substantially along the primed optical axis direction 246' in coordinate system 312.

Light beam 202B''' passes through a first scan lens 236 and a second scan lens 238. The light beam 202B''' which exits the second scan lens 238, renders an image spot 262B on a surface 242 of a photosensitive medium 244. The photosensitive medium 244 may be flat or curved. The curved photosensitive medium 244 may include, but is not limited to a shape of a cylinder. The photosensitive medium 244 may be a photoconductor. Image spots 262A and 262L are also shown on the surface 242 or the photosensitive medium 244.

Image spots 262A, 262B, and 262L are aligned at an angle theta prime 104' relative to the scan axis direction 106', as defined by coordinate system 312. The scan axis direction 106' is also referred to as the scan direction. Rotation 316 of the photosensitive medium 244 around an axis substantially in the scan axis direction 106' in combination with rotation 306 of the polygon 304 forms scan lines 410A, 410B, and 410L on the photosensitive medium 244. The vertical distance 40' between adjacent scan lines 410A and 410B varies with the angle theta 104 of the light emitter array. Light beams 202A"" and 202L"" are shown and result from emitters 34A and 34L respectively.

Light beams 202A"" and 202L"" may be overscanned beyond a print format in the scan direction 106' to illuminate scan lines 410A and 410L on a surface 336 of an optical sensor 318. A connection 320 communicates signals from the first optical sensor 318 to a controller 322. The controller 322 processes information from the optical sensor 318 to determine the vertical separation 42' between the light beams 202A"" and 202L"" and hence the vertical separation between scan lines 410A and 410L.

The controller 322 compares the vertical separation 42' with a desired swath height value 334 which may be stored in a memory element in the controller, stored externally from the controller 322, or input to the controller from an external source. The controller 322 compares the vertical separation 42' with the desired swath height value 334 (See FIG. 14), and generates an error value A control signal 324 including electrical voltage or current signals, for example, an electrical signal 330 such as a pulse 331 or other types of signals are formed from the error value 340. As an example, the pulse 331 can have a pulse width 332 ranging from about 1 millisecond to 10 seconds. The pulse 331 is shown to be positive, even though pulse 331 can be negative and of various controllable amplitudes.

The control signal 324 drives an actuator 326. The actuator may include a coreless direct current motor operatively coupled to a cam. The actuator may also include a gear reducer. One or more pulses 331, having a 1 millisecond pulse width 332, may be used to move the actuator a very small and precise amount. A pulse 331 having a 10 second pulse width 332 may be used to move the actuator 326 a full revolution or more.

The actuator 326 is operatively coupled to either the prism element 44, the prism element 46, the prism element 54, the prism element 56, or combinations thereof. For clarity and simplicity, actuation is described in below in further detail only for prism elements 44 and 46. It is understood that the actuation methods described herein for prisms 44 and 46 apply equally to prism elements 54 and 56, and to combinations of prism elements 44, 46, 54 and 56. The actuator 326 may rotate 308 either the first 44 or the second 46 optical element or combinations thereof around a vertical axis 250. The prism element 44 may be rotated 308 around a vertical axis 252. The prism element 46 may be rotated 308 around a vertical axis 254. Either the first 44 or the second 46 prism elements, or combinations thereof may be rotated 308 around a vertical axis 328 which has been displaced from vertical axes 250, 252, and 254. Furthermore, prism elements 44 or 46 or both may be rotated 308 around any vertical axis, as shown by the vertical axis direction 108 in coordinate system 310. The prism elements 44 or 46 or both may be rotated 308 to reduce the magnitude of the error value 340 as described in reference to FIG. 14. As will be shown and described in reference to FIG. 21, the actuator 326 may also be configured to selectively rotate 338 either the prism element 44 or the prism element 46, or both the prism element 44 and the prism element 46 around an optical axis direction 246.

FIG. 14 shows swaths 402, 404, 406, and 408 which are correctly aligned 400 according to an embodiment of an electrophotographic printing system. Emitters 34A through 34L form light beams 202A through 202L (See FIGS. 2 and 11). Light beams 202A through 202L are scanned by polygon 304 (See FIG. 13) and form a swath 402 which includes scan lines 410A through 410L. Swath 402 is an example of an illumination pattern which can be formed on a surface 242 of a photosensitive medium 244 as shown in FIGS. 11 and 13. The swath 402 may be developed with ink or toner and transferred to media 1418 (See FIG. 24) to form a printed image. In operation, an electrophotographic printing system can modulate the beams forming scan lines within swath 402 to form individual exposed areas which, after development, become printed areas such as pixels, subpixels, half-tone dots and the like. The individual exposed areas can be arranged to render a printed image.

Swath 402 includes scan lines 410A through 410L. Adjacent scan lines 410 are separated by the vertical distance 40'. The most distant scan lines 410A and 410L are separated by the vertical separation 42'. A second swath 404 is above the first swath 402, a third swath 406 is above the second swath 404, and a forth swath 408 is above the third swath 406. A gap 412 occurs between swaths 402 and 404, swaths 404 and 406, and swaths 406 and 408. If the height of the gap 412 between swaths is substantially similar to the vertical distance 40' between adjacent scan lines 410, then banding may not be apparent, or at least minimized.

The vertical distance 40' and the vertical separation 42' are in the vertical direction 108. The long dimension of swaths 402, 404, 406, and 408; and scan lines 410A through 410L are in the scan axis direction 106'.

FIG. 15 illustrates swaths 502, 504, 506, and 508, which are incorrectly aligned 500. Scan lines 510A through 510L are spaced too far apart according to an embodiment of an electrophotographic printing system. In a similar manner as described in FIG. 14, swaths 502, 504, 506, and 508 each have a vertical distance 40" between adjacent scan lines 510A through 510L. Scan lines 510A through 510L occur within a swath. The most distant scan lines 510A and 510L are separated by a vertical separation 42". The vertical distance 40" between adjacent scan lines 510 within a swath is greater than a gap 512 which occurs between swaths 502, 504, 506, and 508. This increased vertical distance 40" may be a result of angle theta 104 (See FIGS. 1 and 3) on the light emitter array 22 (See FIG. 12) being large, causing the gap 512 to be less than the vertical distance 40" between adjacent scan lines 510. The relatively small gaps 512 between swaths 502, 504, 506, and 508 visually appear as banding. Two scan lines 510A and 510L on each side of the gap 512 appear as a dark band.

FIG. 16 illustrates swaths 602, 604, 606, and 608, which are incorrectly aligned 600. Scan lines 610A through 610L are spaced too close together according to an embodiment of an electrophotographic printing system.

In a similar manner as described in FIG. 14, swaths 602, 604, 606, and 608 each have a vertical distance 40'" between adjacent scan lines 610A through 610L. The most distant scan lines 610A and 610L are separated by a vertical separation 42'". The vertical distance 40'" between adjacent scan lines 610 within a swath is narrower than a gap 612 which occurs between swaths 602, 604, 606, and 608. This relatively smaller vertical distance 40'" may be caused by too small of an angle theta 104 (See FIG. 2) on the light emitter array 22, which in turn can cause the gap 612 to be wider than the vertical distance 40'" between adjacent scan lines 610 within a swath. The relatively large gaps 612 between the swaths 602, 604, 606, and 608 visually appear as banding. The anomalously wide gap 612 between the two scan lines 610A and 610L appears as a light band.

Figure 17:
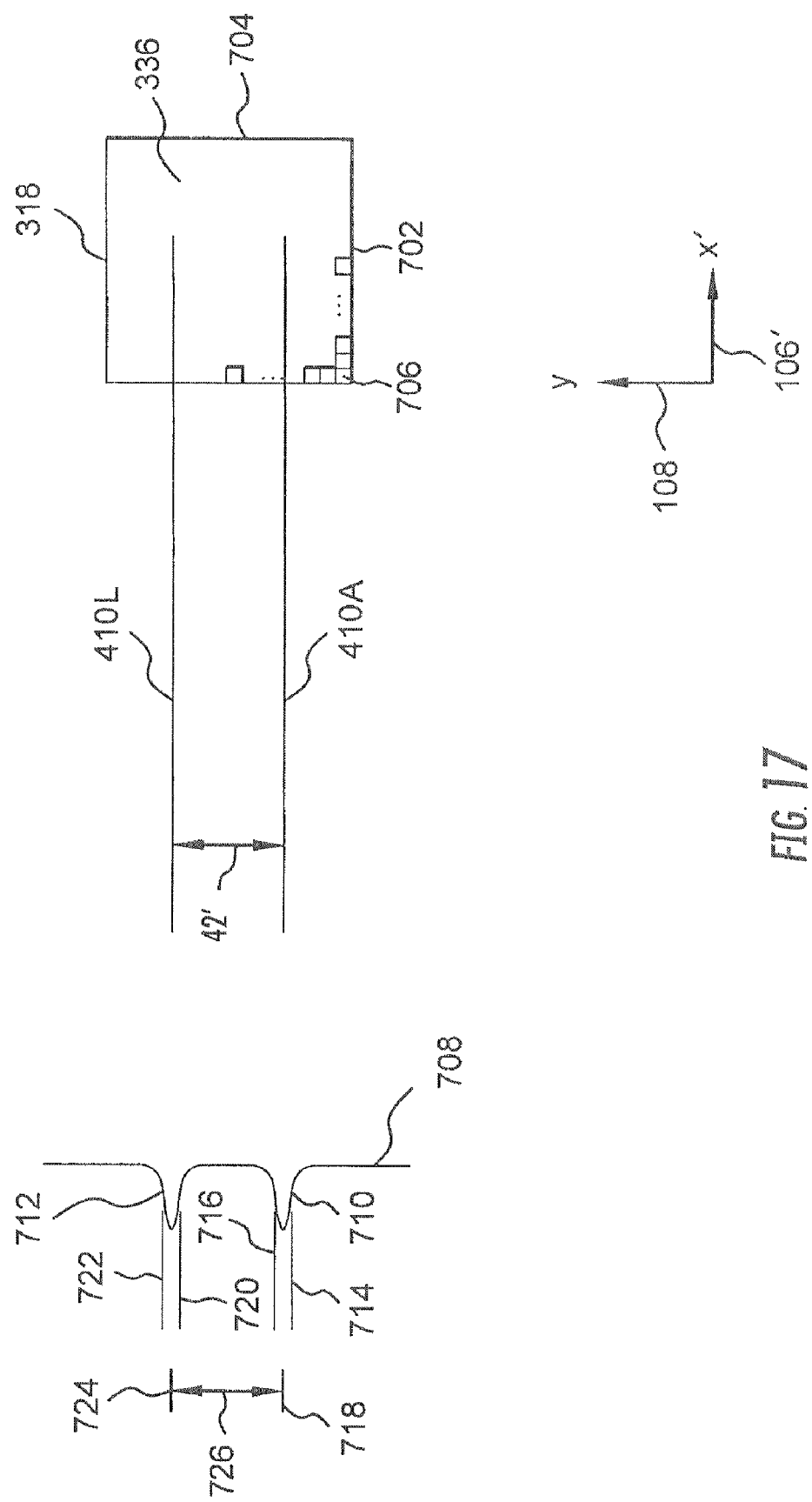
FIG. 17 is a diagram illustrating scan lines illuminating an optical sensor and the spatial distribution of light according to an example embodiment.

FIG. 17 shows an optical sensor 318 illuminated with scan lines 410A and 410L and a spatial exposure distribution profile 708 of sensed scan lines 410A and 410L according to an embodiment of an electrophotographic printing system.

During configuration, alignment, or another procedure, scan lines 410A and 410L may illuminate a first optical sensor 318 at an end of a scan (beyond an edge of a printed image area) as shown in FIGS. 13 and 17. The first optical sensor 318 may also be at the beginning of the scan, such as, before the start of the printed image area, or in any other position in which the first optical sensor 318 may be illuminated. Non-scanning spots 262 (See FIG. 3) formed by light beams 202"" may be positioned on the first optical sensor 318, in combination with, or as a replacement for, scan lines 410A and 410L. The scan lines 410A and 410L are formed by scanning spots 262. The vertical separation 42' between, for example, the most distant scan lines 410A and 410L can be sensed by the first optical sensor 318.

The first optical sensor 318 has a width 702 along the scan axis direction 106' and a height 704 along a vertical direction 108. Optical sensor elements 706 may be arranged along the width 702 and height 704. The optical sensor 318 may be, but is not limited to, a charge coupled device, a CMOS device, a multi-element photodiode, a photosensitive medium, a position sensitive device, or a split sensor.

The scan lines 410A and 410L form the spatial exposure distribution profile 708 along a vertical direction 108 on the surface 336 of the first optical sensor 318. The spatial exposure distribution profile 708 has a first peak 710 and a second peak 712 coincident with the exposure intensity of the first scan line 410A and the last scan line 410L respectively. Alternately, other scan lines could be used. The peaks 710 and 712 may also represent a spatial distribution of the exposure of non-scanning spots 262 (See FIG. 3) on the first optical sensor 318. The peaks 710 and 712 may also represent the spatial exposure distribution profile 708 of the exposure intensity of the scan lines 410A and 410L averaged in the scan axis direction 106'. The distance 726 between the first 710 and second 712 peaks is an indicator of the vertical separation 42'. Averaging, or other data processing in the scan axis direction 106' can reduce the variability of the measured distance 726 between the first 710 and second 712 peaks and increase the accuracy of the measurement.

The distance 726 between the first 710 and second 712 peaks can be calculated by the difference between an estimate of the location of the second peak 724 and an estimate of the location of the first peak 718. An estimate of the location 718 of the first peak 710 may be obtained by measuring a first edge 714 of the first peak 710 and a second edge 716 of the first peak 710, and by averaging the first edge 714 with the second edge 716, the edges being determined by the intersection of the exposure distribution 708 and a predetermined exposure level (not shown). Likewise, an estimate of the location 724 of the second peak 712 can be obtained by measuring a first edge 720 of a second peak 712 and a second edge 722 of the second peak 712 and averaging the first edge 720 with the second edge 722. The location of the peaks 718 and 724 can also be estimated by a weighted average, the median, the mode, one half the range, the difference between the first edges 714 and 720, the difference between second edges 716 and 722 or any other calculation of the distance between scan lines 410A and 410L. The calculations of distance 726 may use one or more of multiplication, division, subtraction, or addition, or combinations thereof.

Figure 18:
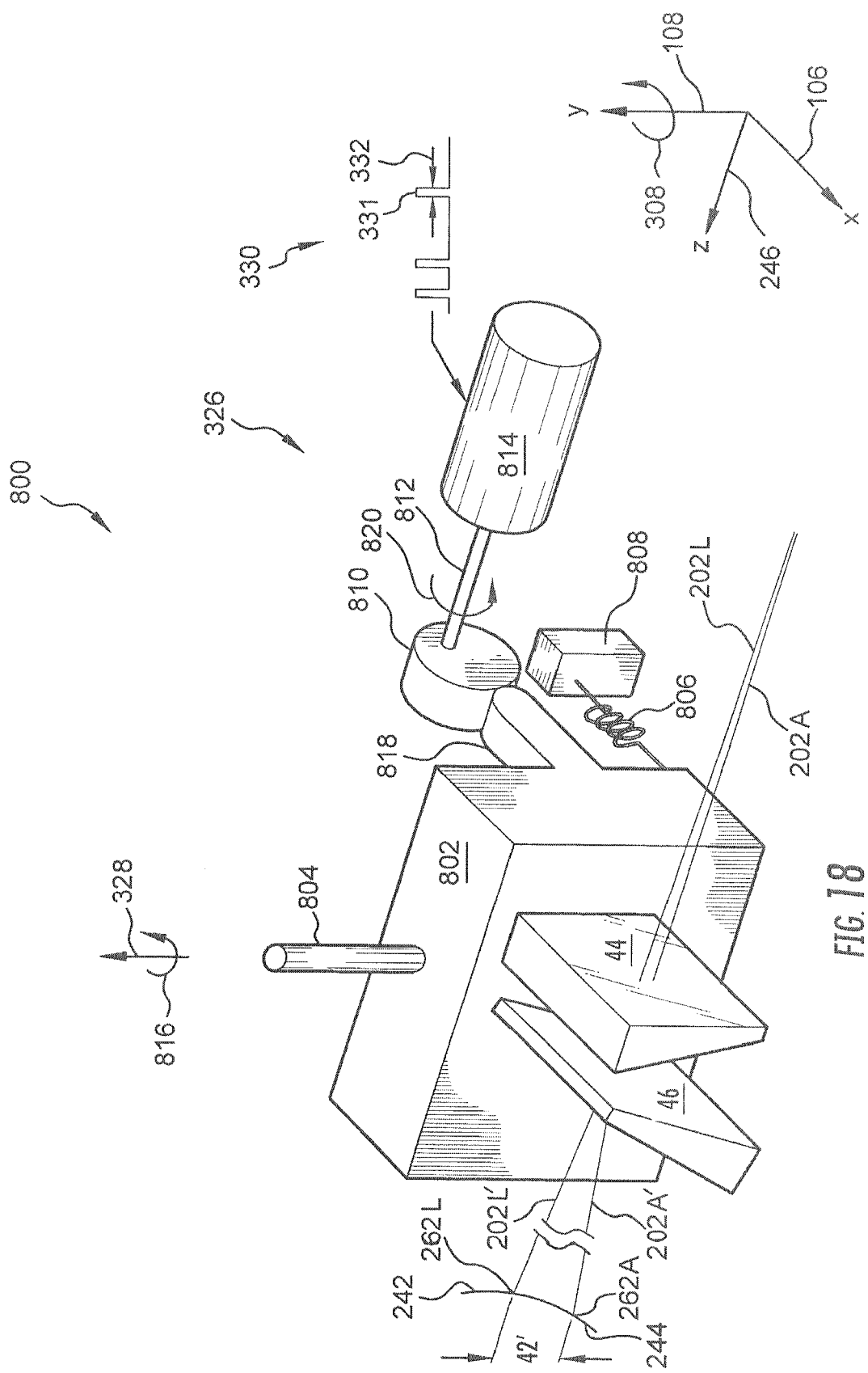
FIG. 18 is a perspective view schematically illustrating an adjustment mechanism for rotating prism elements around a vertical axis according to an example embodiment.

FIG. 18 shows an embodiment of an adjustment mechanism 800 for rotating 308 either a prism element 44, or a prism element 46, or combinations thereof around a vertical direction 108. The rotation 308 is shown as counterclockwise, however it may also be clockwise. All of the light beams 202A through 202L pass through the prism groups 26 and 28, however, not all of the light beams are shown for clarity. One beam is shown for each of the illustrated beams 202A and 202L.

The prism elements 44 and 46 are rotated 816 around an axis 328 in a vertical direction which may or may not be through the prism elements 44 and 46. For example, one or more of prism elements 44, 46, 54, 56 may be rotated 308 around a vertical direction 108 which is in the same direction as the vertical direction 328. The rotation 308 around the vertical direction 108 may be displaced in the scan axis direction 106 or the optical axis direction 246 or both.

Figure 24:
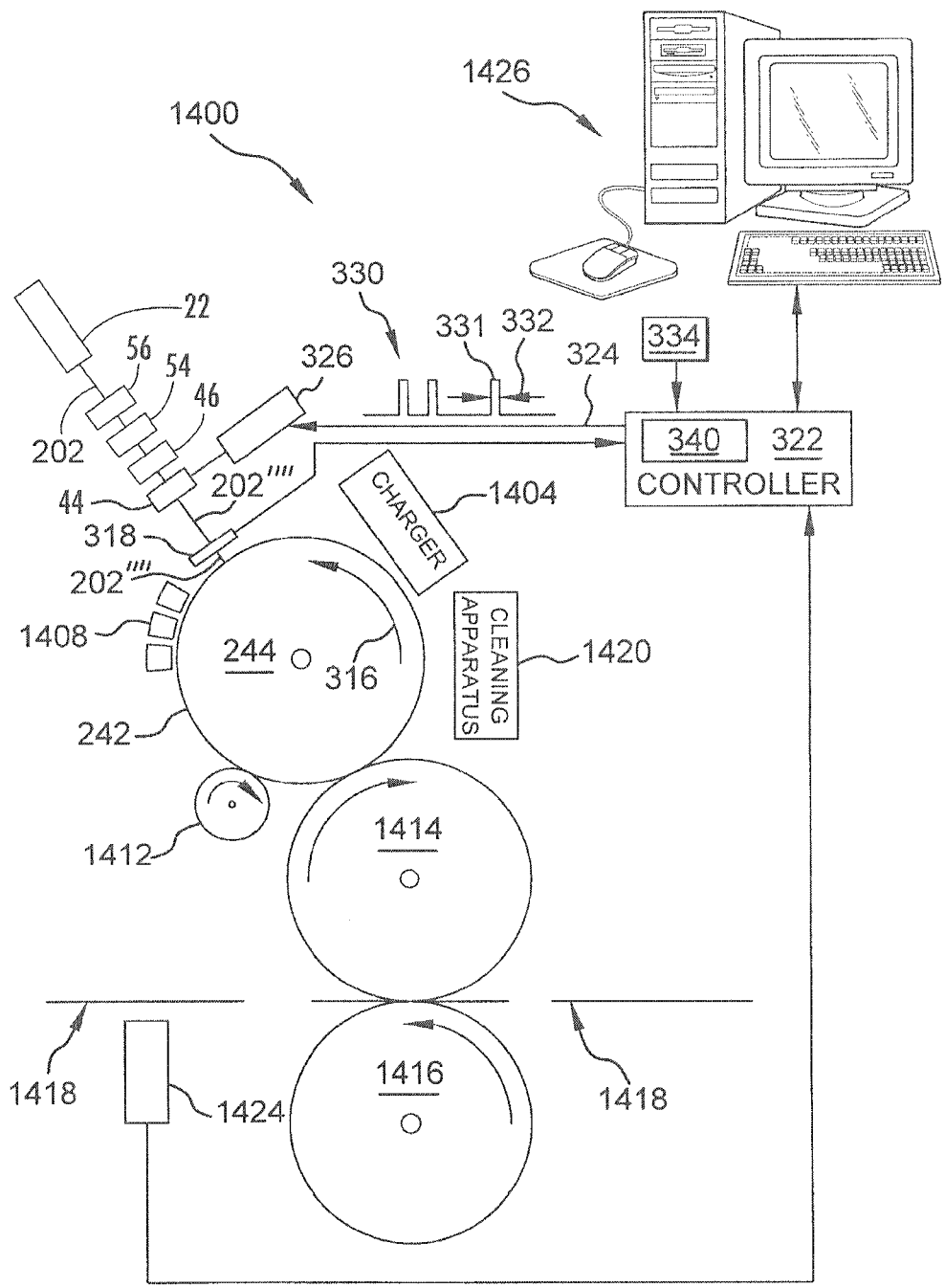
FIG. 24 is a schematic illustration of an electrophotographic printing system according to an example embodiment.

One or more of prism elements 44, 46, 54, 56 may be rotated to reduce the magnitude of the error value 341 as discussed in reference to FIG. 24. In the example illustrated, prism elements 44 and 46 are operatively coupled to a movable mount 802. A surface 818 on the movable mount 802 contacts a cam 810. The cam 810 is coupled to a shaft 812 and may be offset from the shaft. The shaft 812 is coupled to a motor 814. The motor 814 may be a coreless direct current motor and may include a gear reducer (not shown). The cam 810, the shaft, 812, and the motor 814 form an actuator 326. The surface 818 of the movable mount 802 remains in contact with the cam 810 by a retainer 806 which may be a spring, a flexure, a flexible membrane, or any other force producing member. The retainer 806 is attached to a fixed mount 808 which is relatively stationary with respect to the movable mount 802.

The motor 814 is driven by an electrical voltage or current signal. For example an electrical signal 330 including a pulse 331, the pulse 331 having a width 332. A pulse width 332 of 10 seconds for pulse 331 may cause the cam 810 to rotate a complete revolution. A pulse width 332 of 1 millisecond may cause the cam 810 to rotate a small and repeatable amount. Rotation 820 of the cam 810 results in rotation 816 of the movable mount 802 around: a pivot shaft 804, a flex pivot (not shown), or other rotatable bearing to effect rotation 816 of either prism metal and 44 or prism elements 46, or both prism elements 44 and prism elements 46 around an axis 328. The rotation 816 may be clockwise or counterclockwise.

Rotation 816 changes the paths of light beams 202A' and 202L' resulting in a changing vertical separation 42' between the most distant spots 262A and 262L on a surface 242 of a photosensitive medium 244.

Although rotations 308 have been described as rotating around an axis in the vertical direction 108; off-axis deviations due to tolerance inaccuracies, desired optical configurations, or other factors are possible. The rotation 308 about an axis in the vertical direction 108 may also be substantially in the vertical direction, such as, within the range of 45 to 135 degrees from the scan axis direction 106. Also, the vertical direction 108 may be within a narrower range of about 80 to 100 degrees from the scan axis direction 106.

Figure 19:
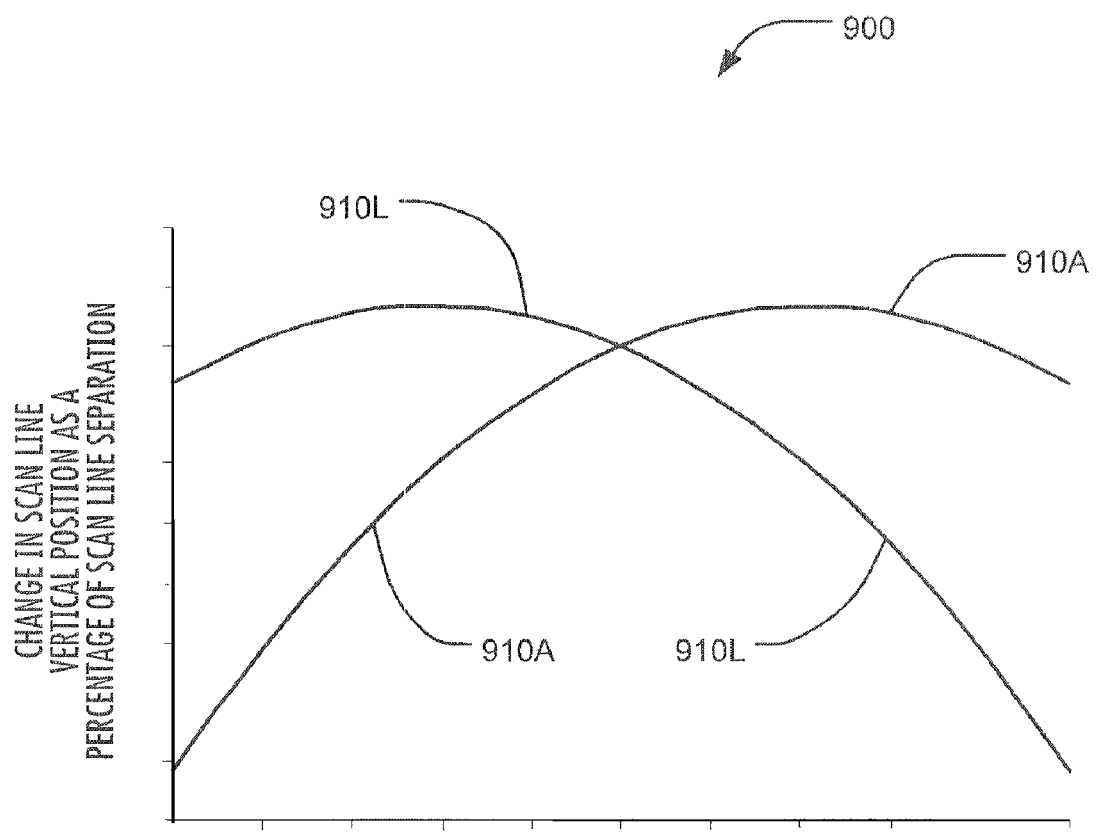
FIG. 19 is a graph of percent change in scan line vertical position as a function of an angle of two prisms rotated around a vertical axis according to an example embodiment.

FIG. 19 is a graph 900 of a scan line vertical position as a function of an optical element rotation around a vertical axis according to an embodiment of an electrophotographic printing system. If prism elements 44, 46 are rotated 816 about a vertical axis 328, the change in a scan line vertical position is shown as a function of prism rotation. The curve 910A shows the change in the vertical position of scan line 410A (See FIG. 4) as a percentage of the nominal distance between scan lines 410A and 410L. Similarly, the curve 910L shows the change in the vertical position of scan line 410L (See FIG. 4) as a percentage of the nominal distance between scan lines 410A and 410L.

Figure 20:
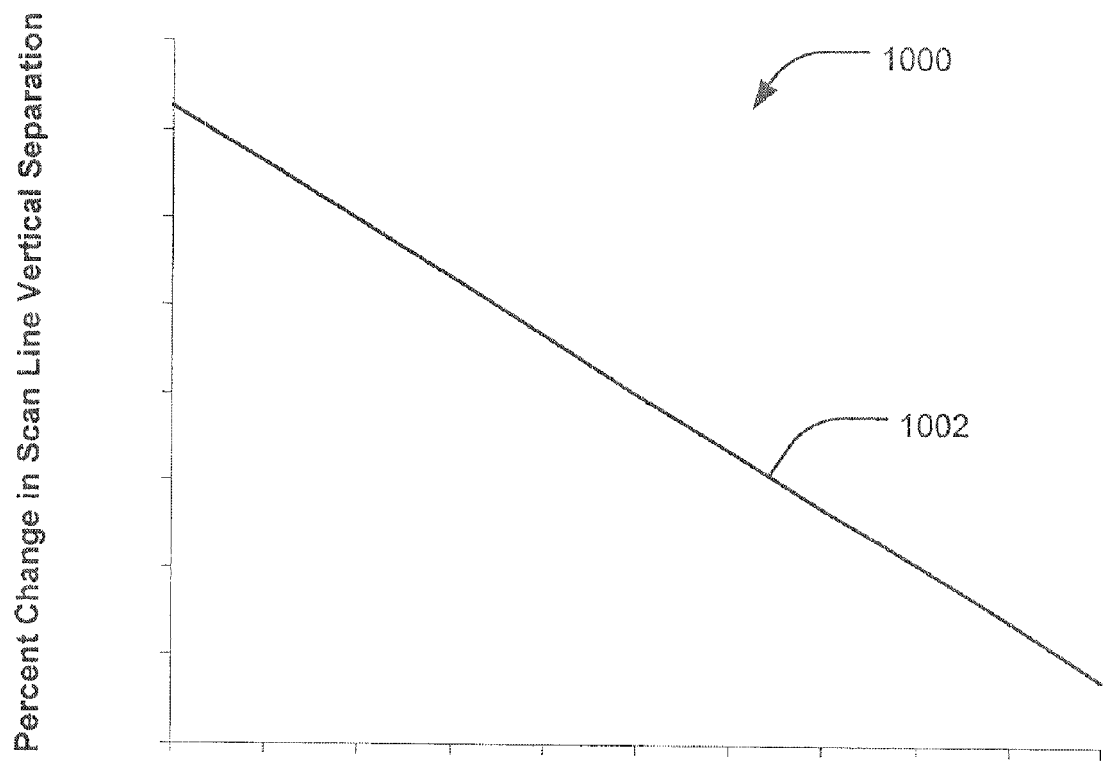
FIG. 20 is a graph of the percent change in the distance between two scan lines as a function of an angle of two prisms rotated around a vertical axis according to an example embodiment.

FIG. 20 is a graph 1000 of the percentage change in the vertical separation between two scan lines as a function of optical element rotation around a vertical axis according to an embodiment of an electrophotographic printing system. Curve 1002 shows the difference between curves 910L and 910A (See FIG. 19) as a percentage change in the vertical separation 42' (See FIG. 14) between most distant scan lines 410A and 410L. Curve 1002 is a function of optical element rotation 816 (See FIG. 18) around a vertical axis 328. The slope of curve 1002 is relatively low, which is a desirable property, in that the rotation 328 (See FIG. 18) of the prism elements 44 and 46 effects a relatively small percentage change in the vertical separation 42'. Curve 1002 is substantially linear over the shown range of rotation 816 (See FIG. 18) about a vertical direction 328. The property of linearity is useful in a control system, because linear relationships have well established theories for stability and system performance.

Figure 21:
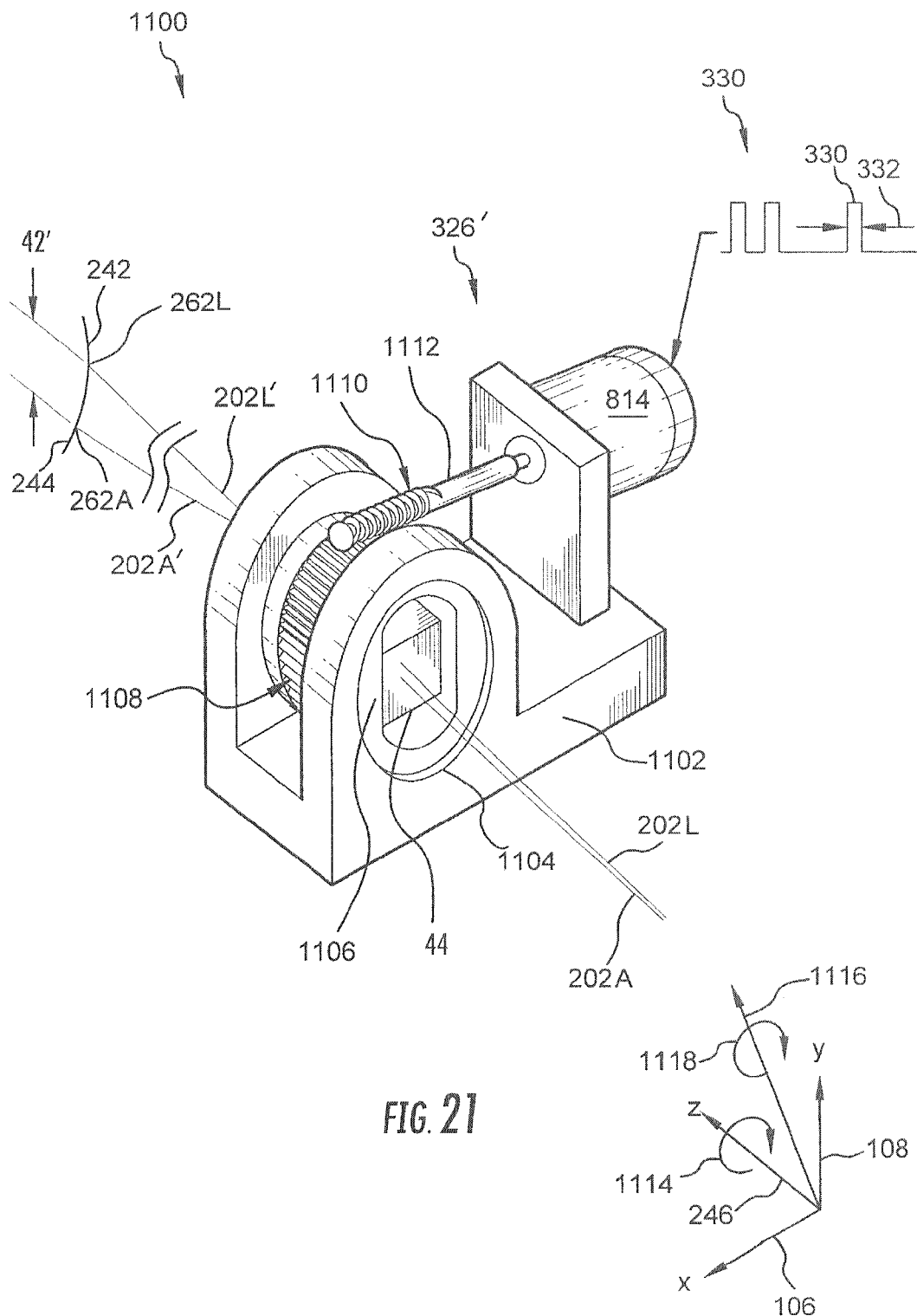
FIG. 21 is a perspective view of another embodiment of the adjustment mechanism of FIG. 18 for rotating optical elements about an optical axis direction according to an example embodiment.

FIG. 21 illustrates another embodiment of an adjustment mechanism 326' for rotating the prisms 44 and 46 (not shown in FIG. 11; however prism element 46 is behind the prism element 44 in the optical axis direction 246 as shown in FIG. 18) around an optical axis direction 246 according to an embodiment of an electrophotographic printing system. The rotation is shown as clockwise, however it may also be counter clockwise. Light beams 202A and 202L pass through the prism elements 44 and 46 (not shown). Not all of the light beams are shown for clarity and one ray, represented by a line is shown for each of the illustrated beams 202A and 202L.

As previously mentioned, the prism element 44 and the prism element 46 (See FIGS. 11, 13, and 18) are rotated around the optical axis direction 246. The prism elements 44 or 46 or both may be rotated to reduce the magnitude of the error value. Prism elements 44 and 46 (See FIGS. 2, 3, and 8) are operatively coupled to a rotary member 1106 having gear teeth 1108. The rotary member 1106 rotates in an opening 1104 within a housing 1102. A helical worm 1110 on a shaft 1112 is operatively coupled to the gear teeth 1108. The shaft 1112 is operatively coupled to a motor 814. The motor 814 may be a coreless direct current motor and may include a gear reducer (not shown). A coreless direct current motor offers repeatable positional control when driven with an electrical signal 330 having a pulse with a width 332, for example, of 1 millisecond. The rotary member 1106, the shaft 1112, and the motor 814 form an actuator 326'.

The motor 814 is driven by an electrical voltage or current signal, for example, an electrical signal 330 having a pulse with a width 332. A pulse width 332 of 10 seconds may cause the prism elements 44 and 46 (See FIGS. 11, 13, and 18) to rotate a complete revolution. A pulse width 332 of 1 millisecond may cause the prism elements 44 and 46 (not shown) to rotate a small and repeatable amount. The pulse may be positive or negative.

When the prism element 44 and the prism element 46 (See FIGS. 11, 13, and 18) are rotated, the angle of beams 202A and 202L change. The changing angle of beams 202A' and 202L' varies the vertical separation 42' of the spots 262A and 262L on the surface 242 of the photosensitive medium 244. The varying vertical separation 42' changes the height of swaths 402, 404, 406, and 408 (See FIG. 14). As an example, the vertical separation 42" (See FIG. 15) of swaths 502, 504, 506, and 508 may be adjusted to a desired swath height value 334 (See FIGS. 13 and 24) to match the vertical separation 42' (See FIG. 14). Therefore, the height of the swaths 502, 504, 506, and 508 (See FIG. 15) may be adjusted by rotating the prism element 44 and the prism element 46 (See FIGS. 11, 13, and 18) around the optical axis direction 246 to match the vertical separation 42'.

It is not necessary to adjust both of the prism elements 44 and 46. The prism element 44 or the prism element 46 may be adjusted independently to achieve a similar effect.

Furthermore, the prism element 44, the prism element 46 (See FIGS. 11, 13, and 18), or both the prism element 44 and the prism element 46 may be rotated 1118 around an axis 1116. The axis 1116 is in the y-z plane as defined by the vertical direction 108 and the optical axis direction 246. The variation in vertical separation 42' (See FIG. 14) by rotation 1118 about the axis 1116 can be expected to produce a curve intermediate to the curves 1002 (See FIG. 20) and 1302 (See FIG. 23) respectively. Although rotations 1118 have been described as rotating 1118 around an axis 136 in the y-z plane; off-axis deviations due to tolerance inaccuracies and desired optical configurations are possible. The axis 1116 may deviate from the y-z plane defined by a vertical direction 108 and an optical axis direction 246 from about 80 to 100 degrees in the scan axis direction 106. Although actuation of prism elements may be described only with respect to prism elements 44 and 46 for clarity, the actuation methods described herein for prisms 44 and 46 apply equally to prism elements 54 and 56, and to combinations of prism elements 44, 46, 54 and 56.

Figure 22:
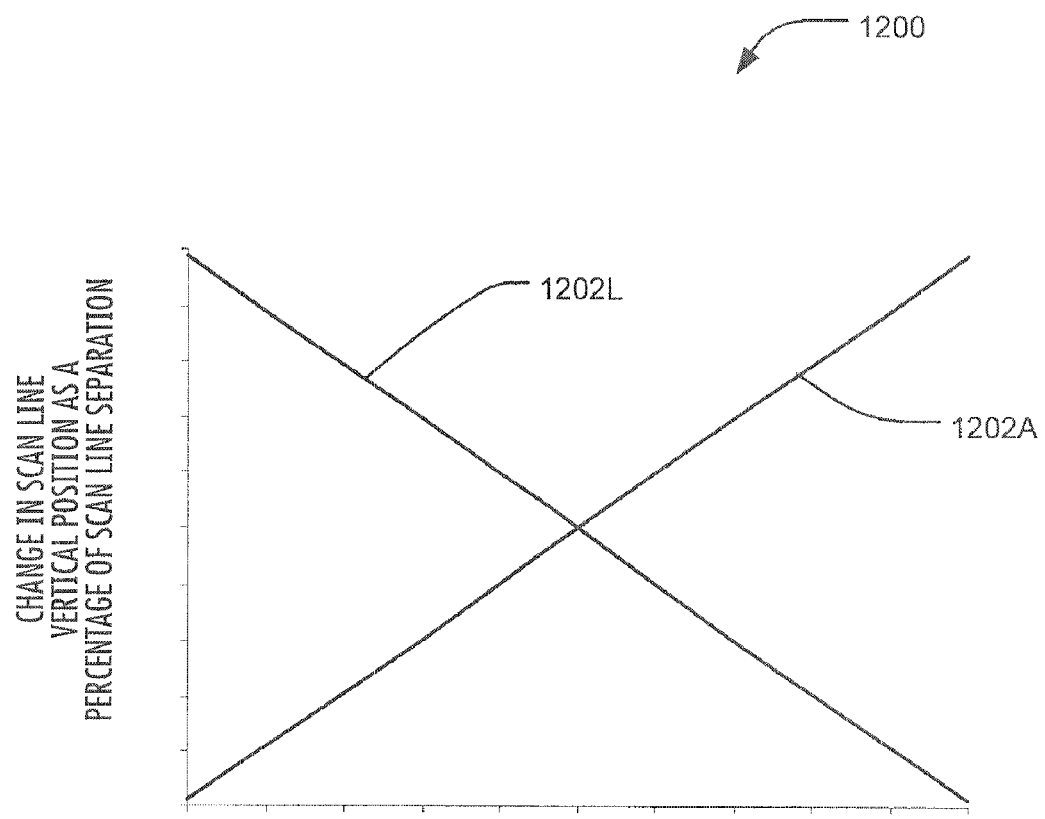
FIG. 22 is a graph of change in scan line vertical position as a function of rotation angle for a group of prisms rotated around the optical axis according to an example embodiment.

FIG. 22 is a graph 1200 of scan line vertical separation as a function of optical element rotation about an optical axis direction according to an embodiment of an electrophotographic printing system. If the prism elements 44 and 46 are rotated 142 about an optical axis direction 246, a change in scan line vertical position is shown as a function of prism rotation 142 in FIG. 22. Curve 1202A shows the change in a vertical position of scan line 410A as a percentage of the nominal distance between scan lines 410A and 410L. Similarly, curve 1202L shows the change in the vertical position of scan line 410L as a percentage of the nominal distance between scan lines 410A and 410L.

Figure 23:
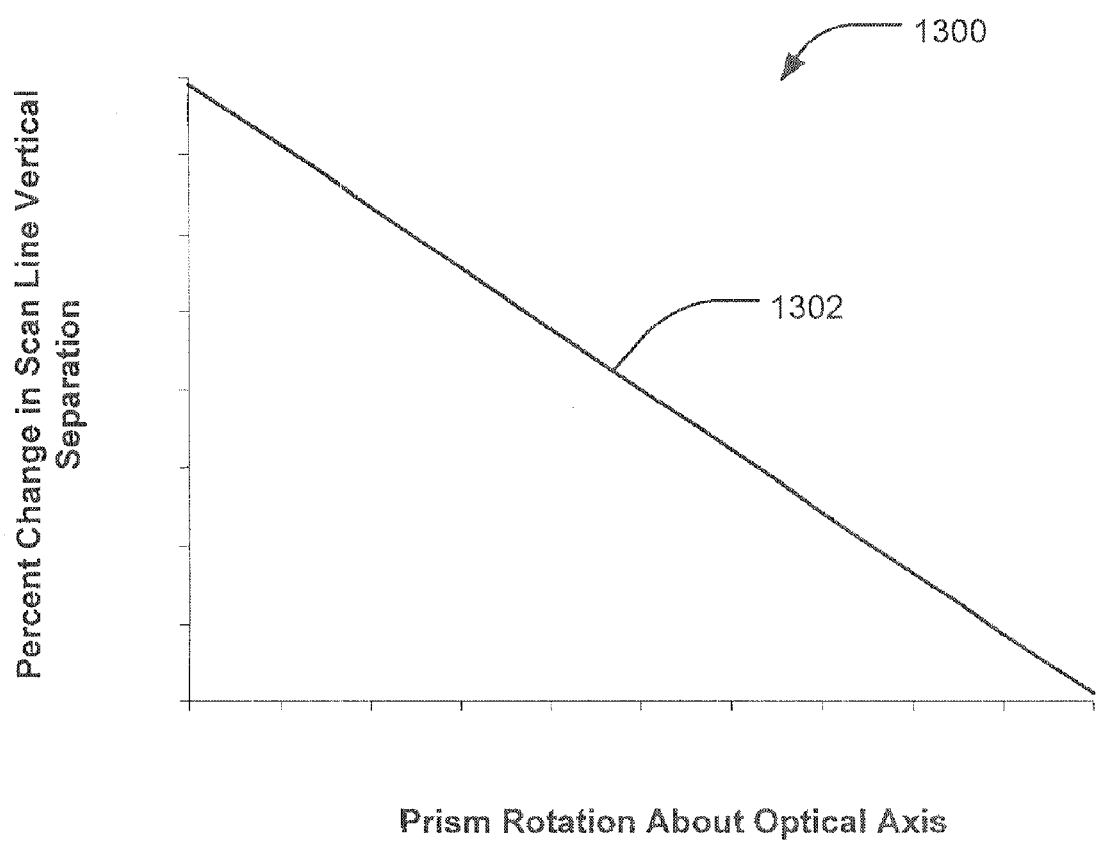
FIG. 23 is a graph of the percent change in the vertical distance between two scan lines as a function of an angle of rotation for a group of prisms rotated around an optical axis according to an example embodiment.

FIG. 23 is a graph 1300 of the percent change in the vertical distance between two scan lines as a function of optical element rotation around an optical axis according to an embodiment of an electrophotographic printing system. Curve 1302 shows the difference between curves 1202L and 1202A (See FIG. 22) and represents the percentage change in vertical separation 42' (See FIG. 14) of scan lines 410 as a function of optical element rotation 142 (See FIG. 21) about an optical axis direction 246. Curve 1302 is substantially linear over the shown range of rotation 142 (See FIG. 21) around the optical axis direction 246. The slope of curve 1302 represents the sensitivity of the change in the vertical separation 42' (See FIG. 14) to the change in rotation 142 (See FIG. 21). Although this sensitivity is greater than for the rotation 816 (See FIG. 18) of the prism elements 44 and 46 around an axis in the vertical direction, it is less sensitive than for the change in the angle theta 104 (See FIG. 13) of the light emitter array 22. This lower sensitivity is useful, since the rotation 142 (See FIG. 11) of the prism elements 44 and 46 effects a relatively small change in the vertical separation 42' (See FIG. 14), as compared with changes to the angle theta 104 (See FIG. 13) of the light emitter array 22. Curve 1302 is substantially linear, making it useful and predictable in a control system, because linear relationships have well established theories for stability and system performance.

FIG. 14 illustrates a system diagram of an electrophotographic printing system 1400 according to an embodiment of an electrophotographic printing system. The methodology of the image formation using the electrophotographic printing system 1400 can be accomplished using dry powder toner or liquid ink (also known as liquid toner) systems, for example, the HP INDIGO® Press 5000, available from Hewlett-Packard.

In an embodiment of an electrophotographic printing system, the surface 242 of a photosensitive medium 244 is electrified by a corotron, scorotron, charge roller or another charger 1404. A light beam or light beams 202 from a light emitter array 22 are incident on the surface 242 of the photosensitive medium 244 and form a latent electrostatically charged image thereon. An ink delivery system 1408 is a dispenser of ink, toner, or another type of colorant. The ink or toner may be a liquid or a powder. The ink delivery system may be a binary ink developer BID. Multiple BID cartridges may be used, each containing a different color ink or toner. The latent image is developed by the ink or toner to form a visible image on the surface 242 of the photosensitive medium 244. In some embodiments of the electrophotographic printing system 1400, a squeegee roller 1412 compresses the image and removes excess liquid therefrom. The image is transferred to an intermediate transfer member ITM 1414. The image is then transferred to a medium 1418 at a nip between the ITM 1414 and an impression roller 1416. After transfer of the image to the ITM 1414, residual toner and charge on the photosensitive medium 244 may be removed by a cleaning apparatus 1420, which may be an electrical discharge and a wiper.

Controller 322 is programmed with software to, among other things control the light emitter array 22 to write latent images. Controller 322 also receives data pertaining to vertical separation 42' (See FIG. 3) and makes corrections to the electrophotographic printing system 1400 for correctly adjusting the vertical separation 42'. For example, the vertical separation 42' can be adjusted by directing the actuator 326 to alter a latent image on the surface 242 of a photosensitive medium 244 by rotating either a prism element 44 a prism element 46 (not shown. See FIGS. 11, 13, and 18) or both.

The adjustment of the vertical separation 42' may be accomplished automatically, or semi-automatically. In an embodiment of the electrophotographic printing system 1400 where the adjustment of the vertical separation 42' is adjusted semi-automatically, data may be provided to the controller 322 through an input device 1426. The input device 1426, for example, may include a keyboard, mouse, or another type of device. The mouse may select adjustment options from a menu. Data provided to the controller 322 by input device 1426 may result from inspections or measurements from a test pattern which has been printed on a medium 1418 by the electrophotographic printing system 1400. The vertical separation 42 (See FIGS. 11, 13, 14 and 18) may be adjusted by rotating one or more of prism elements 44, 46, 54 or 56 (See FIGS. 11, 13 and 18). The prism element 44 may be rotated by an actuator 326 operatively coupled by a control signal 324 to a controller 322. The rotation of one or more of prism elements 44, 46, 54 or 56 (See FIGS. 2, 3 and 8) can change the vertical separation 42' (See FIGS. 13 and 14) on the printed media 1418. The vertical separation 42' can be measured from the printed media 1418 and entered into the input device 1426 which rotates the optical element to change the vertical separation 42'. This process can be continued until an acceptable vertical separation 42' is printed on the media 1418.

In some embodiments of the electrophotographic printing system, the vertical separation 42' (See FIGS. 13 and 14) may be adjusted automatically by a controller 322 using a first sensor 318 in operative communication with the controller 322. The first sensor 318 may detect one or more indicators of vertical separation 42'. The first sensor 318 measures the swath height from light beams 202A"" and 202L"" (See FIG. 13) or scan lines 410A and 410L (See FIGS. 13 and 17). The first sensor 318 may also measure other beams or combinations of beams. The first sensor 318 can be located near an edge of the photosensitive medium 244 (See FIG. 13) or in the conjugate location formed by a folding mirror (not shown) to a near-edge point of the photosensitive medium 244 so that the first sensor 318 does not block the formation of the latent image on the surface 242 of the photosensitive medium 244.

The measured vertical separation 42' (See FIGS. 13 and 14) is compared to a desired swath height value 334 to form an error value. If the vertical separation 42' equals the desired swath height value 334, then the error value is zero, and no adjustment of either the first prism elements 44 or the prism element 46 (See FIGS. 13 and 14) or both occurs. If the vertical separation 42' is greater or less than the desired swath height value 334, then the error value is not zero and either the prism element 44 and the prism element 46 (See FIGS. 11, 13, 14, and 8) or both are rotated to adjust the vertical separation 42' (See FIGS. 13 and 14) to reduce the magnitude of the error value.

The prism elements 44 and 46 can be rotated by an actuator 326 operatively coupled to the controller 322 by a control signal 324. The controller 322 controls the actuator 326 by sending one or more electrical signals 330 having a pulse 331 with a width 332 to the actuator 326 by control signal 324. The controller 322 can command the electrophotographic printing system 1400 to change the vertical separation 42' (see FIGS. 13 and 14) to match a desired swath height value 334. The desired swath height value 334 may be communicated to the controller 322 through a hardware port, by an input device 1426, by in an internal register within the controller 322, and the like.

In other embodiments of the electrophotographic printing system 1400, the vertical separation 42' (see FIGS. 13 and 14) may be adjusted automatically by the controller 322 using a second sensor 1424 in operative communication with controller 322. The second sensor 1424 detects a printed pattern on the media 1418 and operatively communicates with the controller 322 to adjust the prism element 44, the prism element 46 (not shown. See FIGS. 2, 3 and 8), or both by actuator 326 in a similar manner as described in the previous paragraphs.

Figure 25:
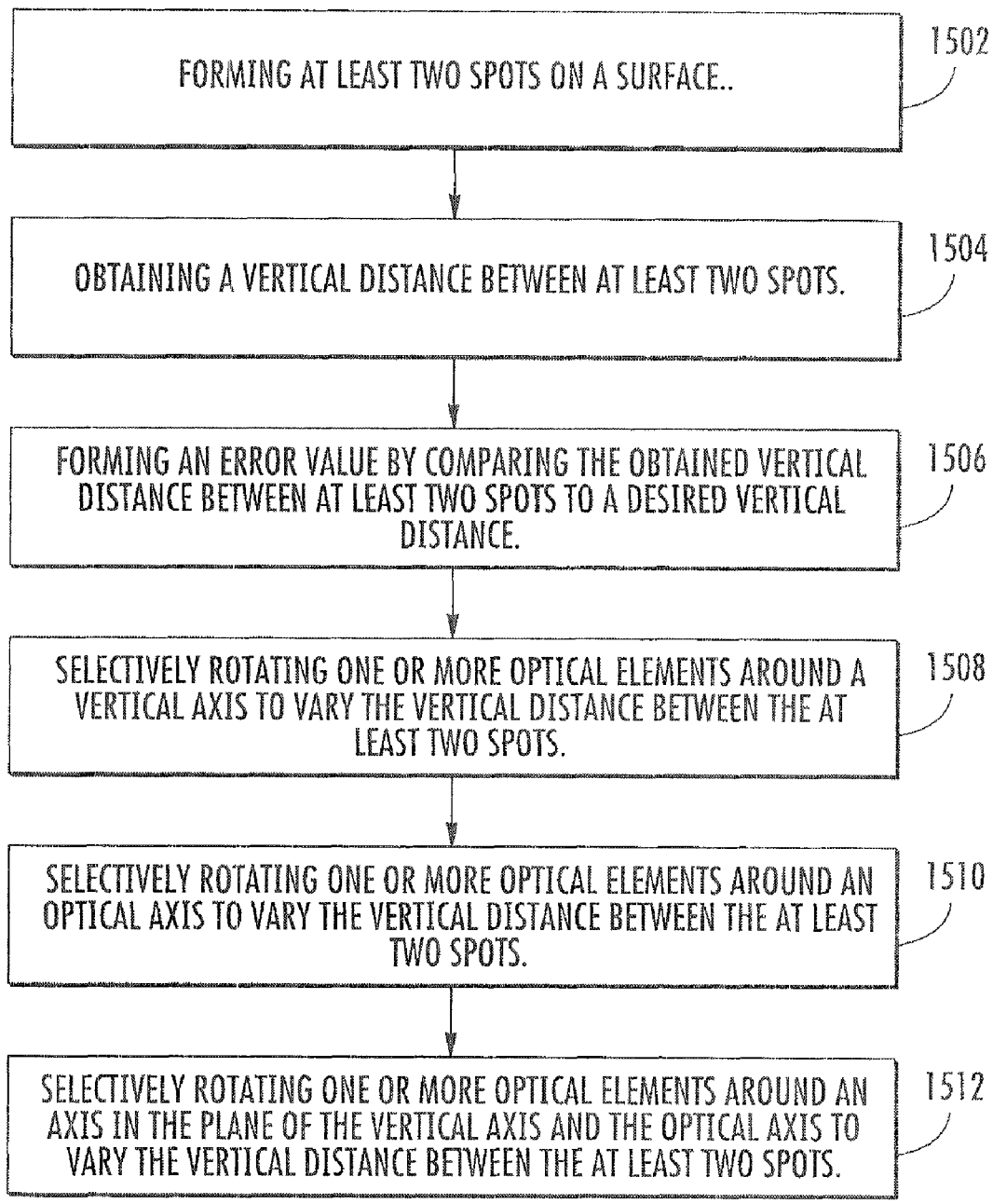
FIG. 25 is a flow diagram of a method according to an example embodiment.

FIG. 25 shows a flow diagram having procedural acts according to an embodiment of an electrophotographic printing system. In act 1502, at least two spots 262 (See FIGS. 11, 13, 18, and 21) are formed on a surface 242 of a photosensitive medium 244. The at least two spots 262 can be used to form an electrostatic latent image on the surface 242 of the photosensitive medium 244. The electrostatic latent image on the surface 242 of the photosensitive medium 244 can be developed with toner or ink to produce a printed image on media 1418 as shown in FIG. 24. The at least two spots 262 may be scanned by rotating a polygon 304 (See FIG. 13) to form an electrostatic latent image and printed swath 402, 404, 406 or 408 (See FIG. 14) with two or more scan lines 410. The printed density of the scan lines 410 may be modulated to render an image (not shown). One form of modulation is to alternately turn on and off a emitter 34 (See FIG. 2) for printing alternate dark and light areas.

In act 1504, a vertical distance between at least two spots 262 (See FIGS. 11 and 13) can be obtained by the vertical separation 42' between most distant spots 262A and 262L, or the vertical distance 40' between adjacent spots 262. A vertical distance may be obtained between any spots 262 even if they are not the most distant or adjacent.

As an example, according to an embodiment of an electrophotographic printing system, the vertical distance, and hence the vertical separation 42' (See FIG. 3), between most distant spots 262A and 262L may be obtained by a first optical sensor 318. Spots 262A and 262L are scanned by rotating 306 polygon 304 to form scan lines 410A and 410L respectively (See FIGS. 13 and 17). The scan lines 410A and 410L are separated by substantially the same vertical separation 42' as spots 262A and 262L. According to an embodiment of an electrophotographic printing system, the distance between the spots 262A and 262L can be obtained by detecting the scan lines 410A and 410L on a first optical sensor 318 as shown and described in reference to FIGS. 3, 7, and 14. The separation between spots 262 may also be obtained by printing spots 262, scan lines 410, or other objects, on a medium 1418 (See FIG. 24) and detecting the vertical distance between the spots 262, the scan lines 410, or the other objects using a second sensor 1424. The second sensor 1424 may be an optical sensor similar to the first optical sensor 318 as shown and described in reference to FIGS. 13, 17, and 24. The second sensor may have a lens to reimage the printed medium onto the sensor.

The distance between the spots 262A and 262L can also be obtained by printing spots 262, scan lines 410, or other objects, on a media 1418 and measuring the vertical distance between the spots 262, the scan lines 410, or the other objects using a measuring device such as a scale, an optical comparator, a microscope, calipers, a scanner device (flatbed or other type) and the like.

In act 1506, an error value 341 (See FIG. 24) is formed by comparing the obtained vertical distance, for example, 42' (See FIGS. 13 and 14) in act 1504 to a desired swath height value 334 (See FIG. 14). The comparison may be made by a controller 322 (See FIGS. 13 and 24). The desired swath height value 334 (See FIGS. 13 and 24) is shown external to the controller, although it can be internal to the controller such as data in memory.

In act 1508, a vertical distance 40' (See FIGS. 11, 13, and 18), or vertical separation 42' between at least two spots 262 may be adjusted by selectively rotating 308 one or more prism elements 44 or 46 about a vertical direction 108, 250, 252, 254, 328. The prism elements 44 and 46 may be prisms. Rotation 308 of one or more of the prism elements 44 or 46 or both may be performed by an adjustment mechanism 800 as shown in FIG. 18.

In act 1510, a vertical distance between at least two spots 262 (See FIG. 21) may be adjusted by selectively rotating one or more prism elements 44, 46, 54, 56 (See FIGS. 11, 13, and 18) around an optical axis direction 246. Rotation of one or more of the prism elements 44 or 46 (See FIGS. 11, 13, and 18) or both may be performed by an adjustment mechanism 326' as shown in FIG. 21.

In act 1512, a vertical distance between at least two spots 262 (See FIG. 11) may be adjusted by selectively rotating 1118 one or more of prism elements 44, 46, 54 end 56 (See FIGS. 11, 13 and 18) around an axis direction 136 (See FIG. 21) which is in the y-z plane of the vertical direction 108 axis and the optical axis 246. The prism elements may be prisms. Rotation 1118 of one or more of the prism elements 44, 46, 54 and 56 (See FIGS. 11, 13, and 18) may be performed by an adjustment mechanism 326' in FIG. 21 which may be tilted at an angle (not shown) between the vertical direction 108 and an optical axis direction 246.

An embodiment of an electrophotographic printing system has been used to describe how prism elements 44, 46, 54, 56 (See FIGS. 11, 13, 18, and 21) can be rotated around an axis in the vertical direction 108, around an axis in the optical axis direction 246, around an axis in the y-z plane formed by the vertical direction 108 and the optical axis direction 246, or around combinations of axes thereof to adjust a vertical separation 42' or a vertical distance 40' between spots 262 or scan lines 410 (See FIG. 14). However, it is not necessary that the axis or axes be 90 degrees from the scan axis direction 106. Substantial angular deviations of the axes, in the range of 45 degrees to 135 degrees from the scan axis direction 106 are acceptable. Deviations in the range of 80 to 100 degrees can be achieved with current optical configurations.

While the present embodiments of an electrostatic printing system have been particularly shown and described, those skilled in the art will understand that many variations may be made therein without departing from the spirit and scope of the embodiments defined in the following claims. The description of the embodiment is understood to include all novel and non-obvious combinations of elements described herein, and claims may be presented in this or a later application to any novel and non-obvious combination of these elements. The foregoing embodiments are illustrative, and no single feature or element would have to be included in all possible combinations that may be claimed in this or a later application. Where the claims recite "a" or "a first" element of the equivalent thereof, such claims should be understood to include incorporation of one or more such elements, neither specifically including nor excluding two or more such elements. Although exemplary embodiments of an electrophotographic printing system have been described, the application is not limited and may include a photocopier, a facsimile machine, a photographic output scanner, analytical equipment, and the like.

What is claimed is:

1. An apparatus comprising:
    a first group of one or more anamorphic prisms having a first beam compression factor C1 and a first smile value S1 and a second group of one or more anamorphic prisms having a second beam compression factor C2 and a second smile value S2, wherein C1 and C2 are both greater than one or both less than one, and wherein the magnitude of (C2·S1)+S2 is less than or equal to 0.000004.

2. The apparatus of claim 1, wherein the NS value is 10% of the lesser of the magnitude of the smile value of the first prism group S1 and the magnitude of the smile value of the second prism group S2.

3. The apparatus of claim 1, wherein the first beam compression factor C1 and the second beam compression factor C2 are approximately equal.

4. The apparatus of claim 1, wherein the first group consists of a first anamorphic prism and a second anamorphic prism and wherein the second group consists of a third anamorphic prism and a fourth anamorphic prism.

5. The apparatus of claim 4, wherein the first anamorphic prism and the third anamorphic prism are formed from a same glass type and have a substantially same vertex angle.

6. The apparatus of claim 4, wherein the second anamorphic prism and the fourth anamorphic prism are formed from a same glass type and have a substantially same vertex angle.

7. The apparatus of claim 1, wherein the first group of anamorphic prisms comprises a first prism element and the second group of anamorphic prisms comprises a second prism element, wherein a vertex angle and an optical material type of the first prism element are substantially identical to a vertex angle and an optical material type for the second prism element.

8. The apparatus of claim 7, wherein the difference in a rotational position of the first group and a rotational position of the second group with respect to an optical axis is substantially 180 degrees.

9. The apparatus of claim 1, wherein the first group of anamorphic prisms and the second group of anamorphic prisms are configured to form an intermediate optical axis between the first group and the second group that is substantially parallel to an input optical axis to the first group and an output optical axis from the second group.

10. The apparatus of claim 1 further comprising an adjustment mechanism coupled to an anamorphic prism of one of the first group and a second group and configured to selectively rotate the anamorphic prism.

11. The apparatus of claim 10 further comprising a first and a second light emitter configured to emit a first and a second light beam, the apparatus configured to form a first image spot and a second image spot on a photosensitive surface, wherein a selective rotation of the anamorphic prism adjusts a spacing between the first and second image spots on the photosensitive surface.

12. The apparatus of claim 11 further comprising a charger configured to electrically charge the photosensitive surface, and a supply of charged printing material configured to apply charged printing material to the photosensitive surface.

13. The apparatus of claim 1 further comprising:
    an emitter configured to produce a beam of light; and
    a photosensitive surface;
    wherein the first group and the second group are configured to transmit the beam through the first group and the second group before the beam exposes the photosensitive surface.

14. A method comprising:
    Constructing and arranging a first group of one or more anamorphic prisms to have a first beam compression factor C1 and a first smile value S1 and constructing and arranging a second group of one or more anamorphic prisms to have a second beam compression factor C2 and a second smile value S2, wherein C1 and C2 are both greater than one or both less than one, and wherein (C2×S1)+S2 has a numerical smile value NS of less than or equal to 0.000004; and
    directing three or more light beams through the first group of anamorphic prisms and the second group of anamorphic prisms.

15. The method of claim 14, wherein (C2×S1)+S2 is the lesser of the magnitude of the smile value of the first prism group S1 and the magnitude of the smile value of the second prism group S2.

16. The method of claim 14, further comprising constructing and arranging the first group to have a first transverse chromatic aberration value T1 and constructing and arranging the second group to have a second transverse chromatic aberration value T2, wherein the magnitude of (C2·T1)+T2 is smaller than the magnitude of the first transverse chromatic aberration value T1 and the magnitude of the second transverse chromatic aberration value T2.

17. The method of claim 14, wherein the first group and the second group are inverted with respect to each other by rotation about an optical axis.

* * * * *

UNITED STATES PATENT AND TRADEMARK OFFICE
CERTIFICATE OF CORRECTION

PATENT NO. : 7,751,124 B2  Page 1 of 1
APPLICATION NO. : 12/258739
DATED : July 6, 2010
INVENTOR(S) : David Kenny Towner et al.

It is certified that error appears in the above-identified patent and that said Letters Patent is hereby corrected as shown below:

In column 32, line 33, in Claim 14, delete "Constructing" and insert -- constructing --, therefor.

Signed and Sealed this

Sixteenth Day of November, 2010

David J. Kappos
*Director of the United States Patent and Trademark Office*